US008744212B2

(12) United States Patent
Ishizaka

(10) Patent No.: US 8,744,212 B2
(45) Date of Patent: Jun. 3, 2014

(54) IMAGE PROCESSING MASK CREATING METHOD, NON-TRANSITORY COMPUTER-READABLE RECORDING MEDIUM HAVING IMAGE PROCESSING MASK CREATING PROGRAM RECORDED THEREON, IMAGE PROCESSING DEVICE, AND NON-TRANSITORY COMPUTER-READABLE RECORDING MEDIUM HAVING IMAGE PROCESSING PROGRAM RECORDED THEREON

(75) Inventor: Kanya Ishizaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 106 days.

(21) Appl. No.: 13/585,479

(22) Filed: Aug. 14, 2012

(65) Prior Publication Data

US 2013/0243350 A1    Sep. 19, 2013

(51) Int. Cl.
G06K 9/20    (2006.01)

(52) U.S. Cl.
USPC .......................................................... 382/283

(58) Field of Classification Search
None
See application file for complete search history.

(56) References Cited

U.S. PATENT DOCUMENTS

| | | | |
|---|---|---|---|
| 5,111,310 A | 5/1992 | Parker et al. | |
| 5,535,020 A * | 7/1996 | Ulichney | 358/3.13 |
| 5,696,602 A * | 12/1997 | Cooper et al. | 358/3.19 |
| 5,963,715 A * | 10/1999 | Shu et al. | 358/1.9 |
| 6,088,512 A * | 7/2000 | Ancin et al. | 358/1.9 |
| 6,304,340 B1 * | 10/2001 | Wang | 358/1.9 |
| 6,493,112 B1 | 12/2002 | Arce et al. | |
| 6,917,443 B1 * | 7/2005 | Wang | 358/1.9 |
| 6,989,913 B2 * | 1/2006 | Asai | 358/1.9 |
| 7,440,141 B2 * | 10/2008 | Kuiper | 358/3.19 |
| 2002/0051147 A1 | 5/2002 | Asai | |
| 2002/0163528 A1 * | 11/2002 | Cooper | 345/596 |
| 2003/0035146 A1 * | 2/2003 | Yu et al. | 358/3.14 |
| 2005/0195442 A1 | 9/2005 | Inoue et al. | |
| 2008/0101678 A1 * | 5/2008 | Suliga et al. | 382/132 |
| 2010/0034444 A1 * | 2/2010 | Emhoff et al. | 382/129 |

FOREIGN PATENT DOCUMENTS

| | | |
|---|---|---|
| JP | B2-3427026 | 5/2003 |
| JP | B2-4010097 | 9/2007 |
| JP | B2-4143560 | 6/2008 |
| JP | B2-4168033 | 8/2008 |

OTHER PUBLICATIONS

Ulichney, "Dithering with Blue Noise", Proceedings of the IEEE, vol. 76, No. 1, pp. 56-79, Jan. 1988.*
Ancin et al., "New void-and-cluster method for improved halftone uniformity", J. Electron. Imaging. 8(1), 104-111 (Jan. 1, 1999).*

(Continued)

Primary Examiner — Bhavesh Mehta
Assistant Examiner — Feng Niu
(74) Attorney, Agent, or Firm — Oliff PLC

(57) ABSTRACT

An image processing mask creating method includes calculating cluster energy of each point in an image processing mask, ranking the points in ascending order or descending order on the basis of the calculated cluster energy values, and allocating threshold values to the points in the image processing mask on the basis of the ranks as the process result of the ranking, wherein the cluster energy is defined as the sum of interaction values $f_r(\|x-y\|)$ having the distance $\|x-y\|$ between a target point x and a point y belonging to a cluster not including the target point x as a parameter.

20 Claims, 29 Drawing Sheets

(56) References Cited

OTHER PUBLICATIONS

Ulichney, "A review of halftoning techniques", SPIE, vol. 3963, pp. 378-391, 2000.*

Baqai et al., "Digital color halftoning", Signal Processing Magazine, IEEE, on pp. 87-96 vol. 22, Issue: 1, Jan. 2005.*

Bayer, "An Optimum Method for Two-Level Rendition of Continuous-Tone Pictures," *Proc. IEEE Int. Conf. Comm.*, pp (26-11)-(26-15), 1973.

Kang, "Iterative and Search-Based Methods," *Digital Color Halftoning, IEEE Press*, Chapter 17, 1999, p. 401.

Ishizaka, "New Spatial Measure for Dispersed-dot Halftoning Assuring Good Point Distribution in Any Density," *IEEE Transactions on Image Processing*, vol. 18, No. 9, pp. 1-18, Sep. 2009.

Lau et al., "Digital halftoning by means of green-noise masks," *Journal of Optical Society of America A*, vol. 16, No. 7, pp. 1575-1586, Jul. 1999.

Ostromoukhov, "Pseudo-Random Halftone Screening for Color and Black & White Printing," *The $9^{th}$ International Congress in Non-Impact Printing Technologies*, pp. 1-8, Oct. 4-8, 1993.

Ostromoukhov et al., "Stochastic Clustered-Dot Dithering," *Journal of Electronic Imaging*, vol. 8, No. 4, pp. 1-10, 1999.

Ulichney, "The void-and-cluster method for dither array generation," *SPIE*, vol. 1913, pp. 332-343, 1993.

Kaji, "Stochastic Screening Techniques and their Surroundings," *Journal of Printing Science and Technology*, vol. 32, No. 1, pp. 20-27, 1995.

* cited by examiner

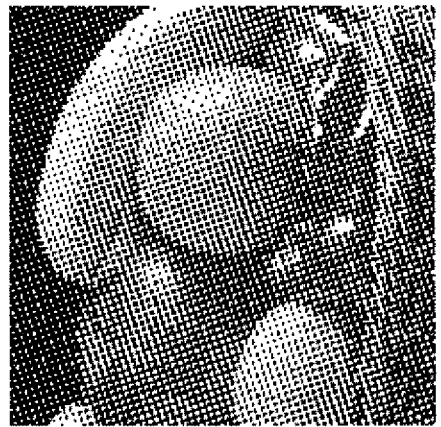
FIG. 3B
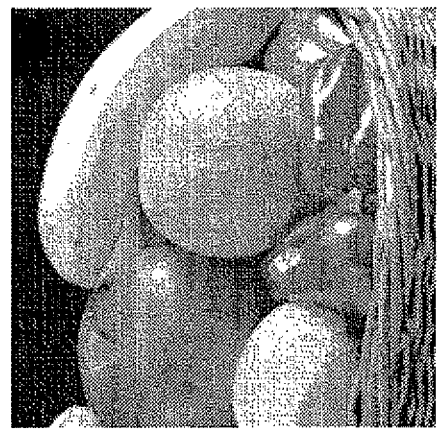
FIG. 3A

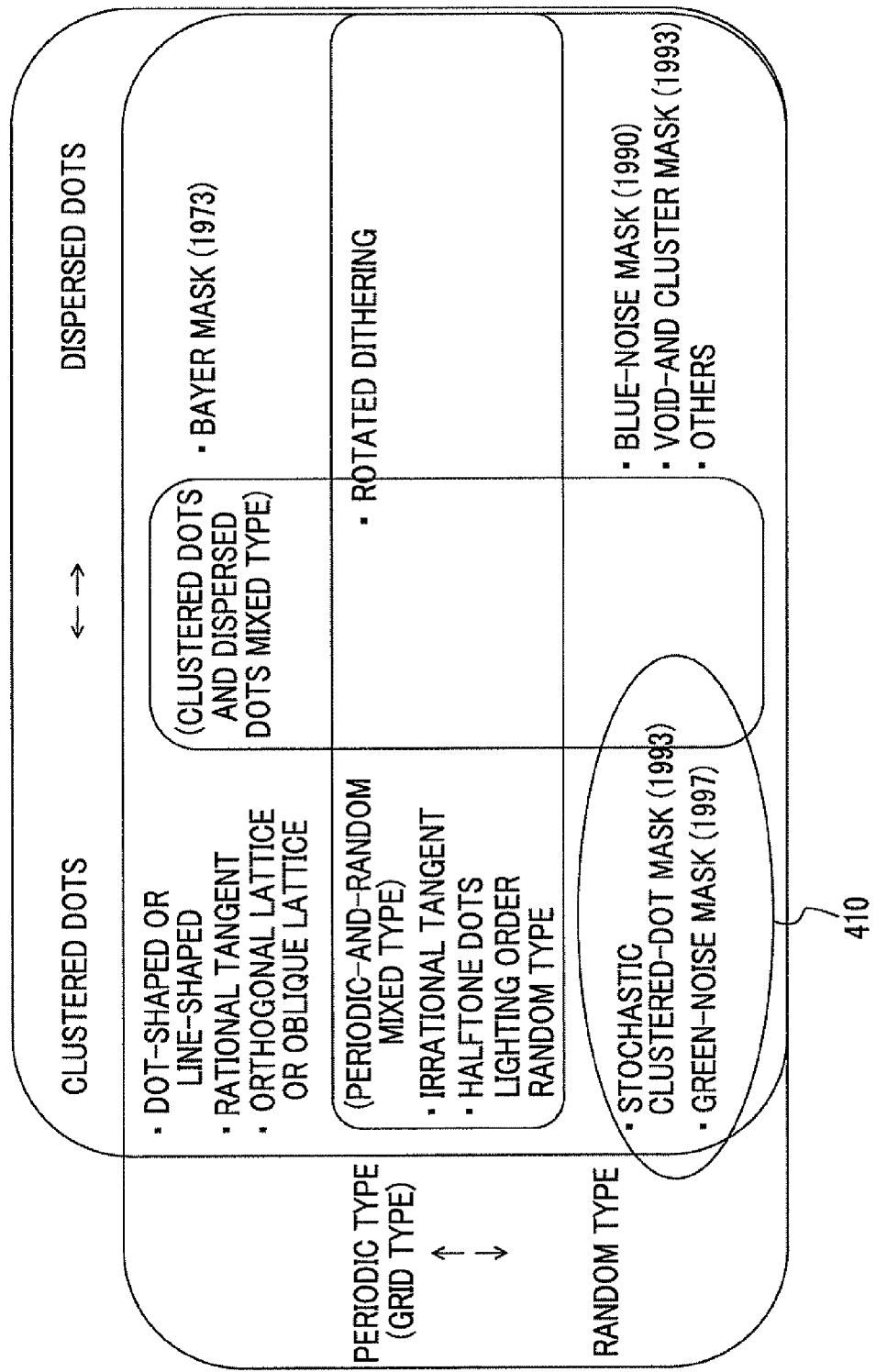

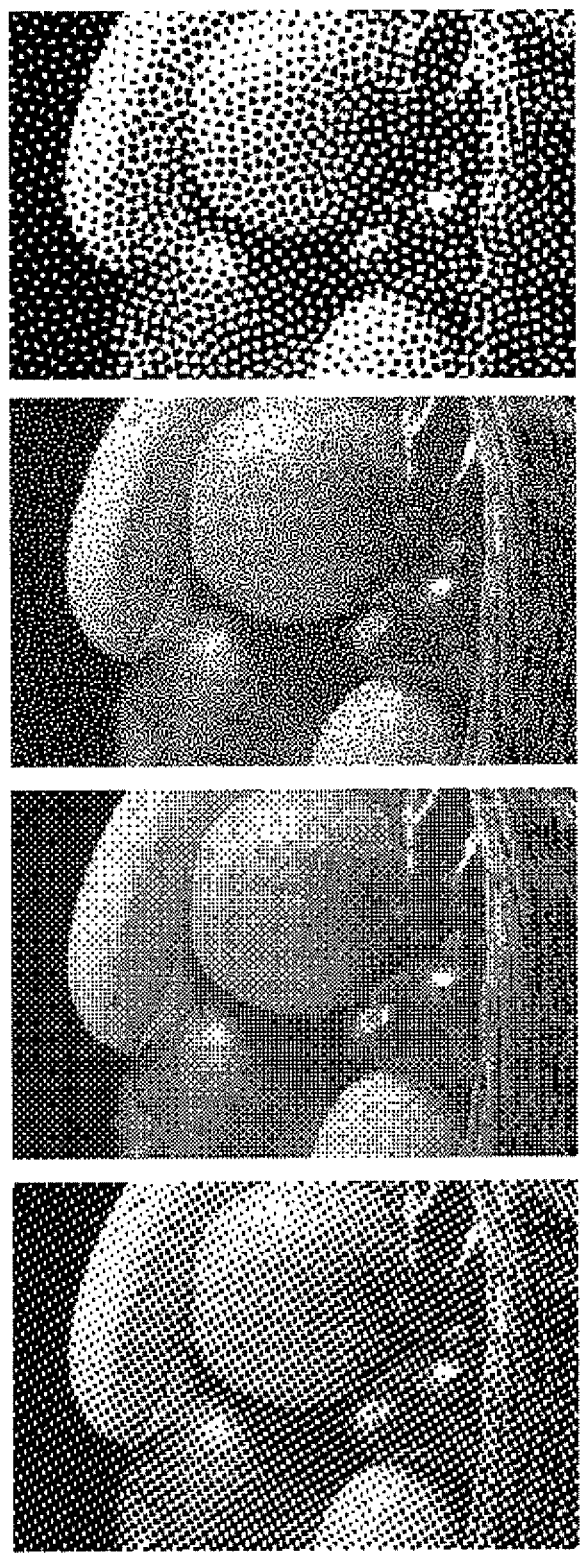

FIG. 6A
FIG. 6B

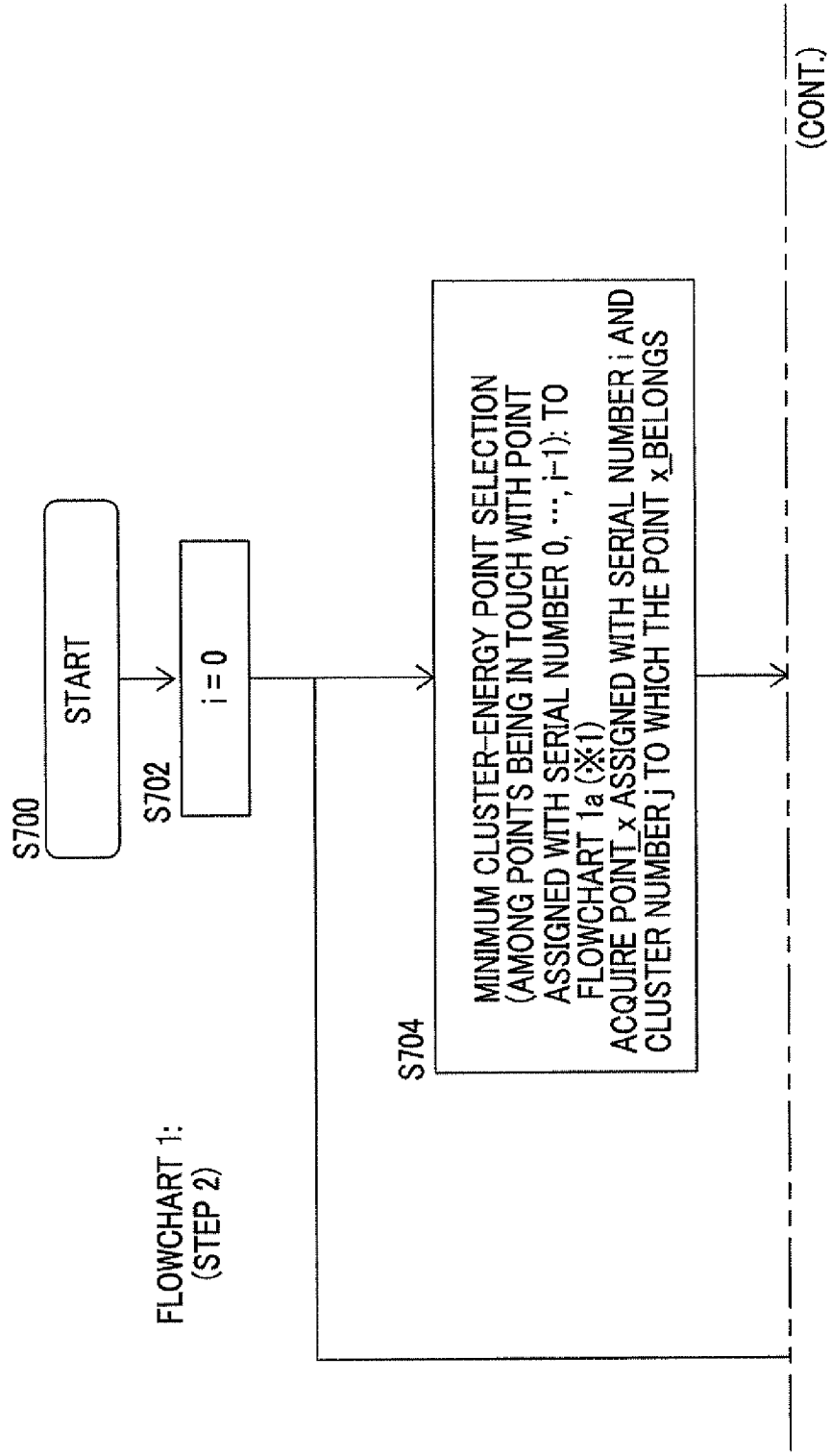

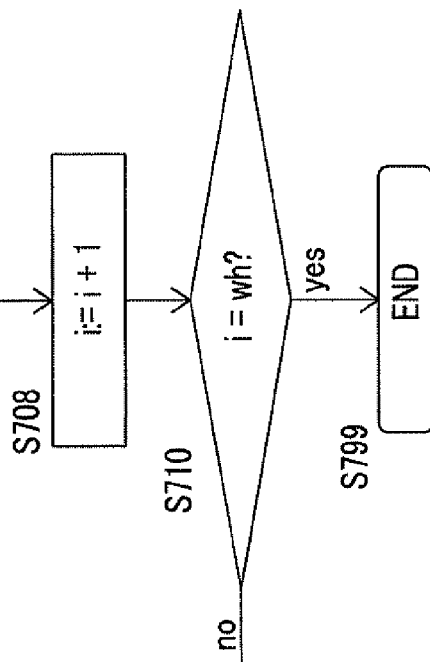

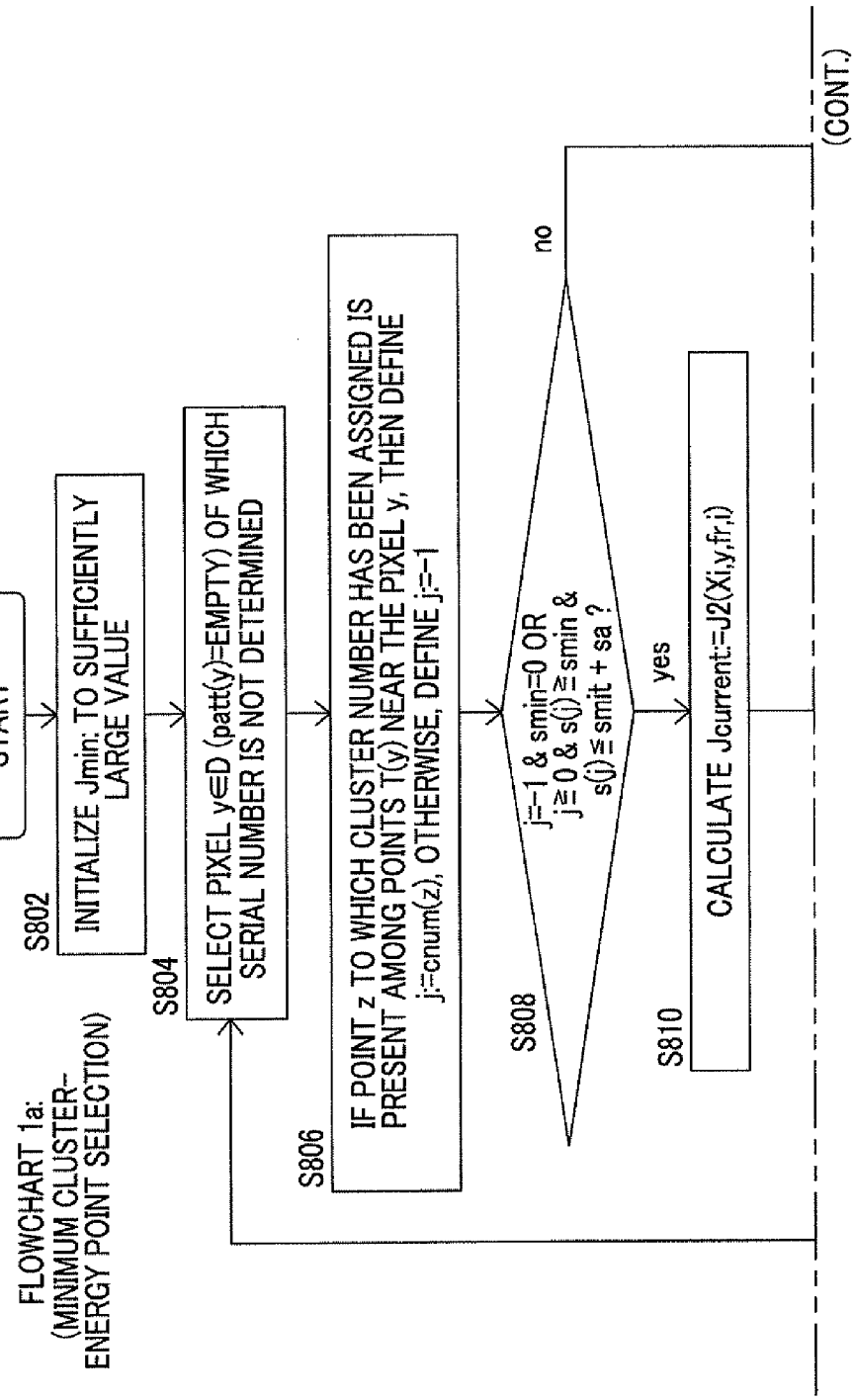

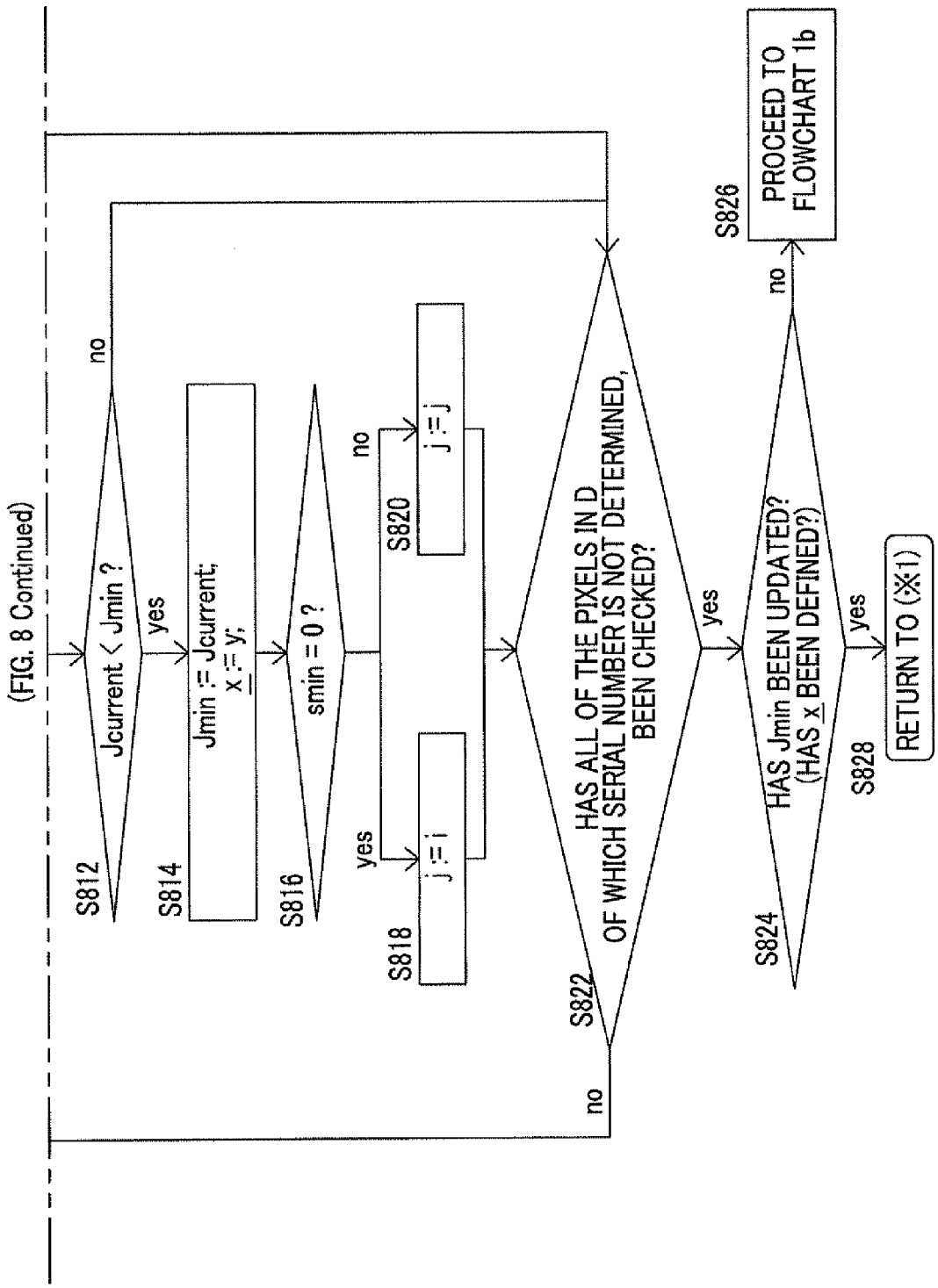

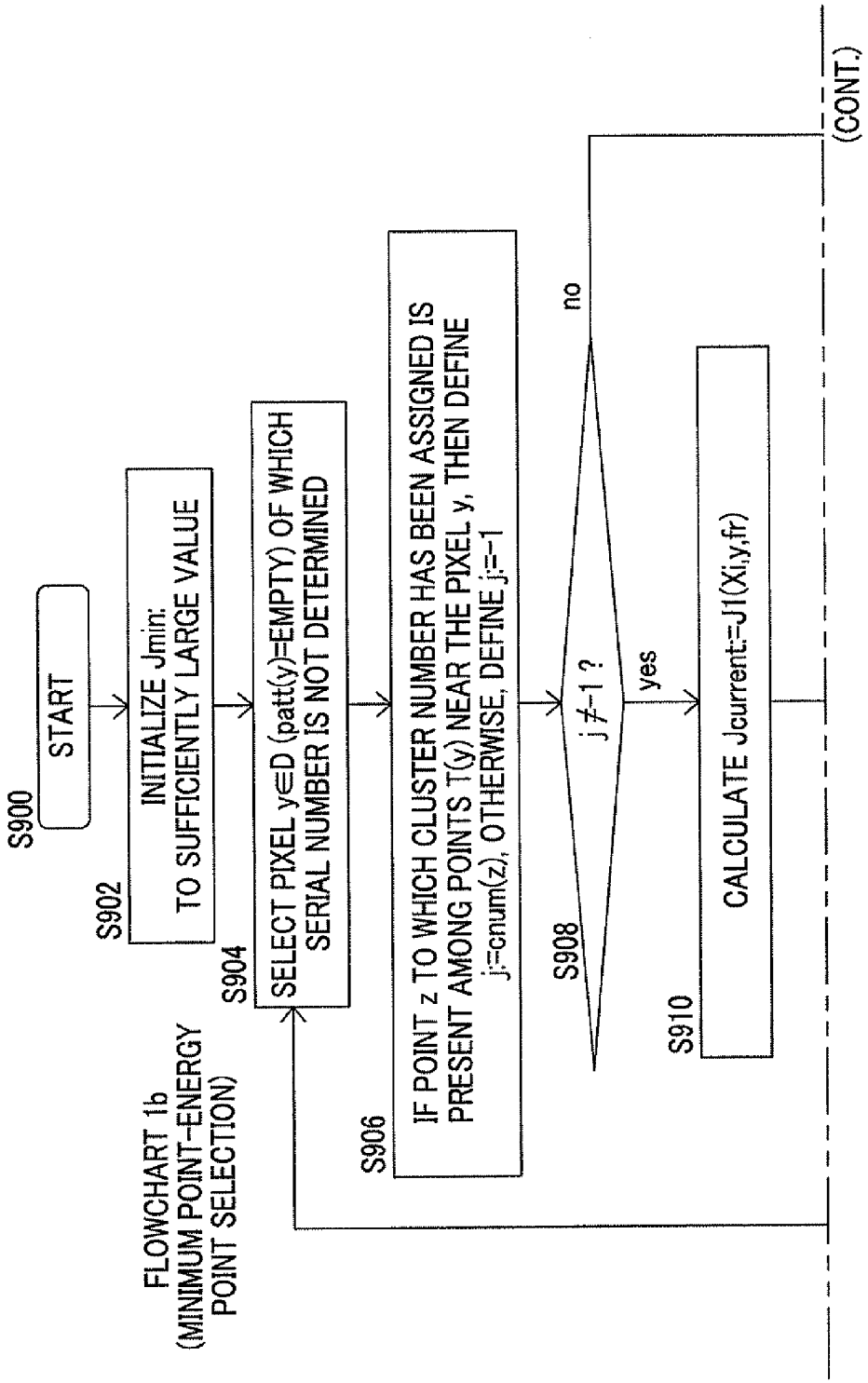

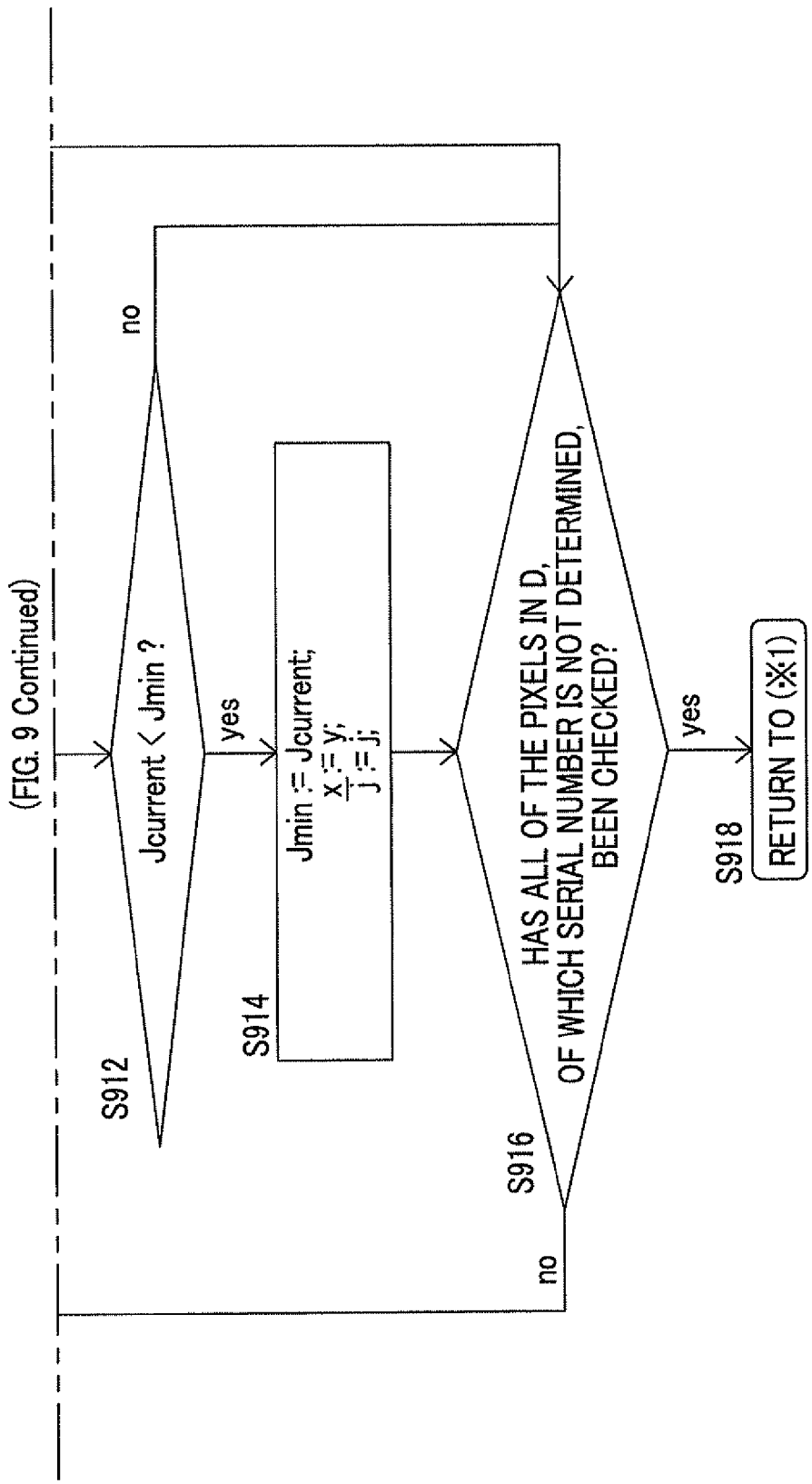

FIG. 10

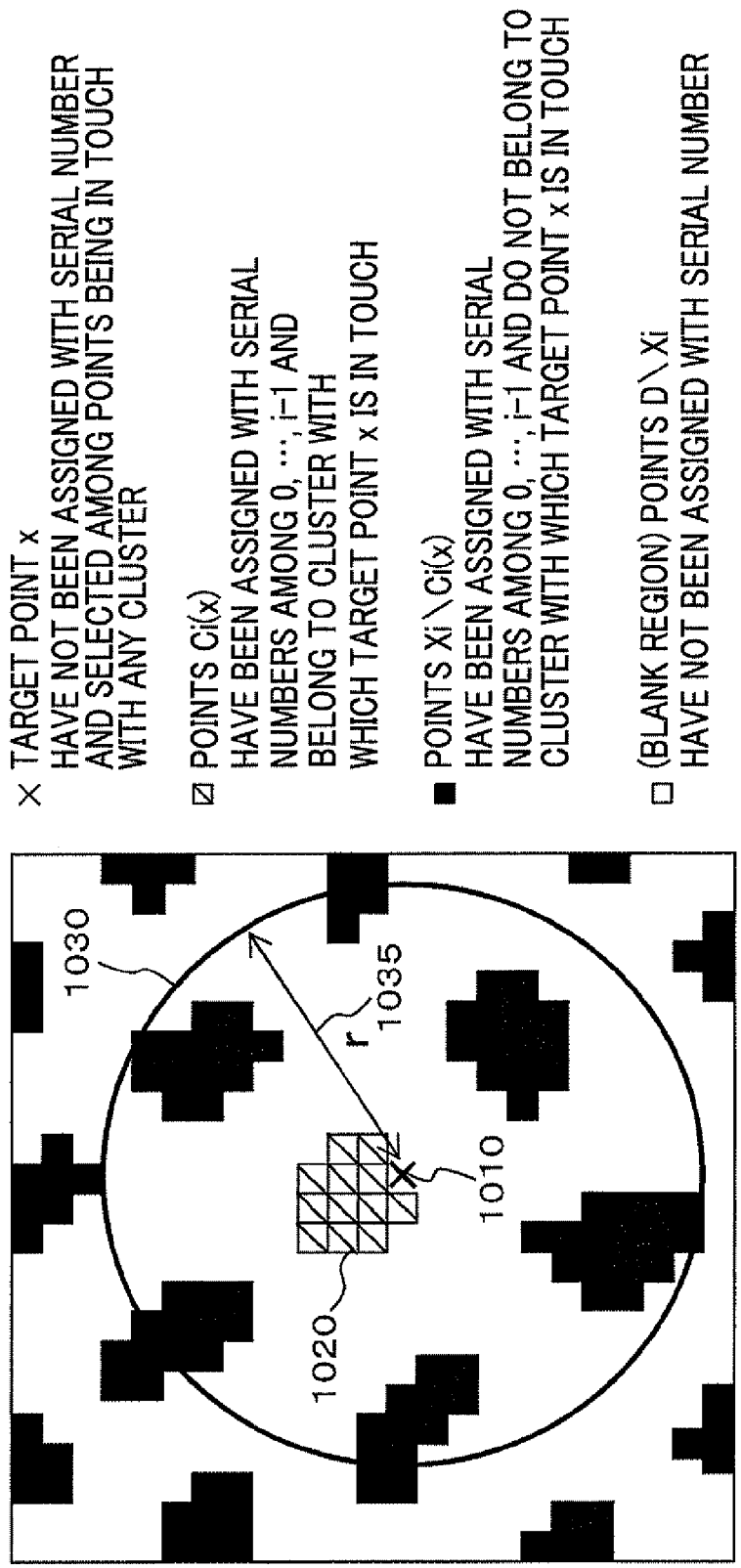

× TARGET POINT x
HAVE NOT BEEN ASSIGNED WITH SERIAL NUMBER AND SELECTED AMONG POINTS BEING IN TOUCH WITH ANY CLUSTER

▨ POINTS $C_i(x)$
HAVE BEEN ASSIGNED WITH SERIAL NUMBERS AMONG 0, ···, i−1 AND BELONG TO CLUSTER WITH WHICH TARGET POINT x IS IN TOUCH

■ POINTS $X_i \setminus C_i(x)$
HAVE BEEN ASSIGNED WITH SERIAL NUMBERS AMONG 0, ···, i−1 AND DO NOT BELONG TO CLUSTER WITH WHICH TARGET POINT x IS IN TOUCH □ (BLANK REGION) POINTS $D \setminus X_i$
HAVE NOT BEEN ASSIGNED WITH SERIAL NUMBER

FIG. 13B
FIG. 13A

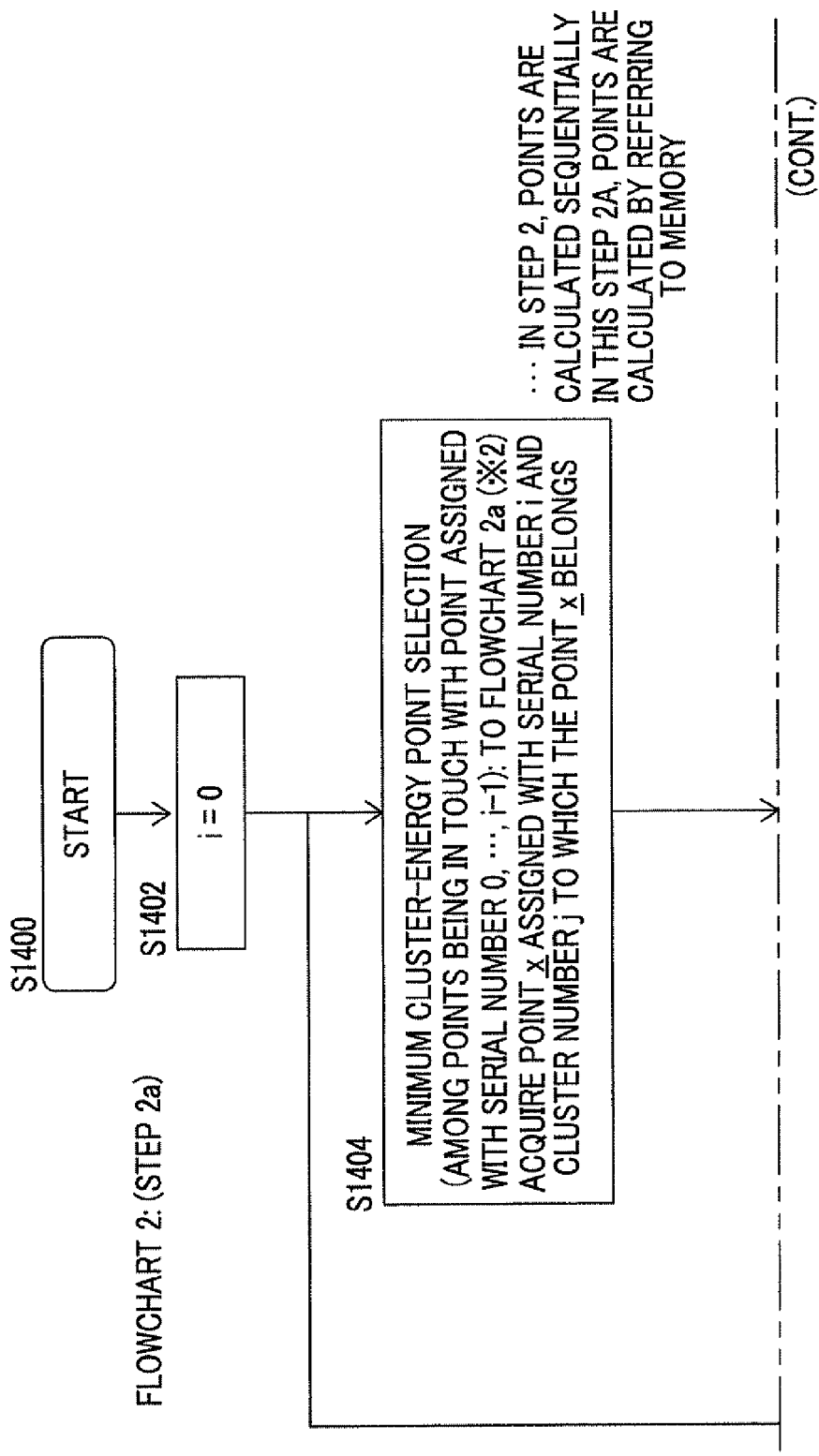

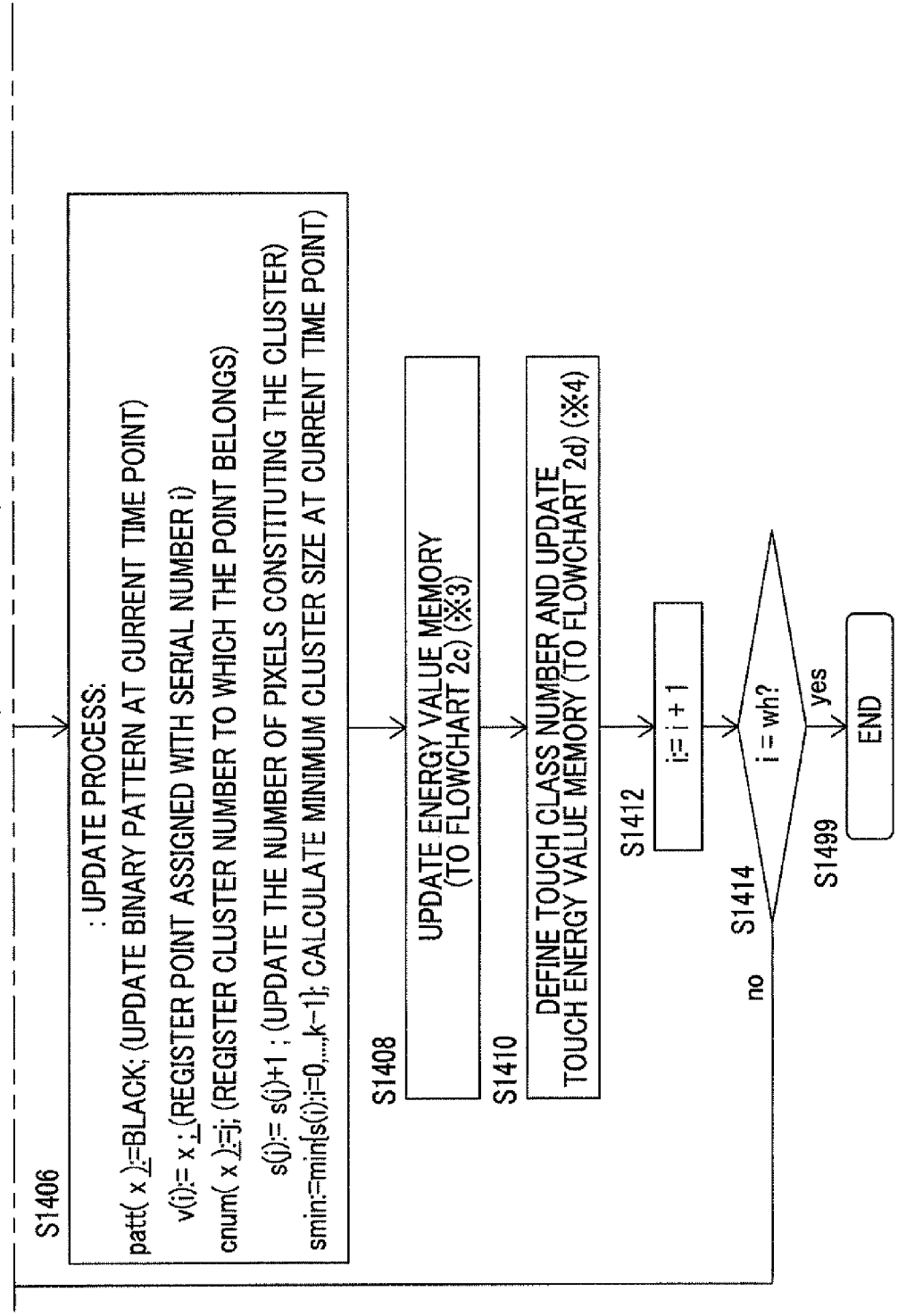

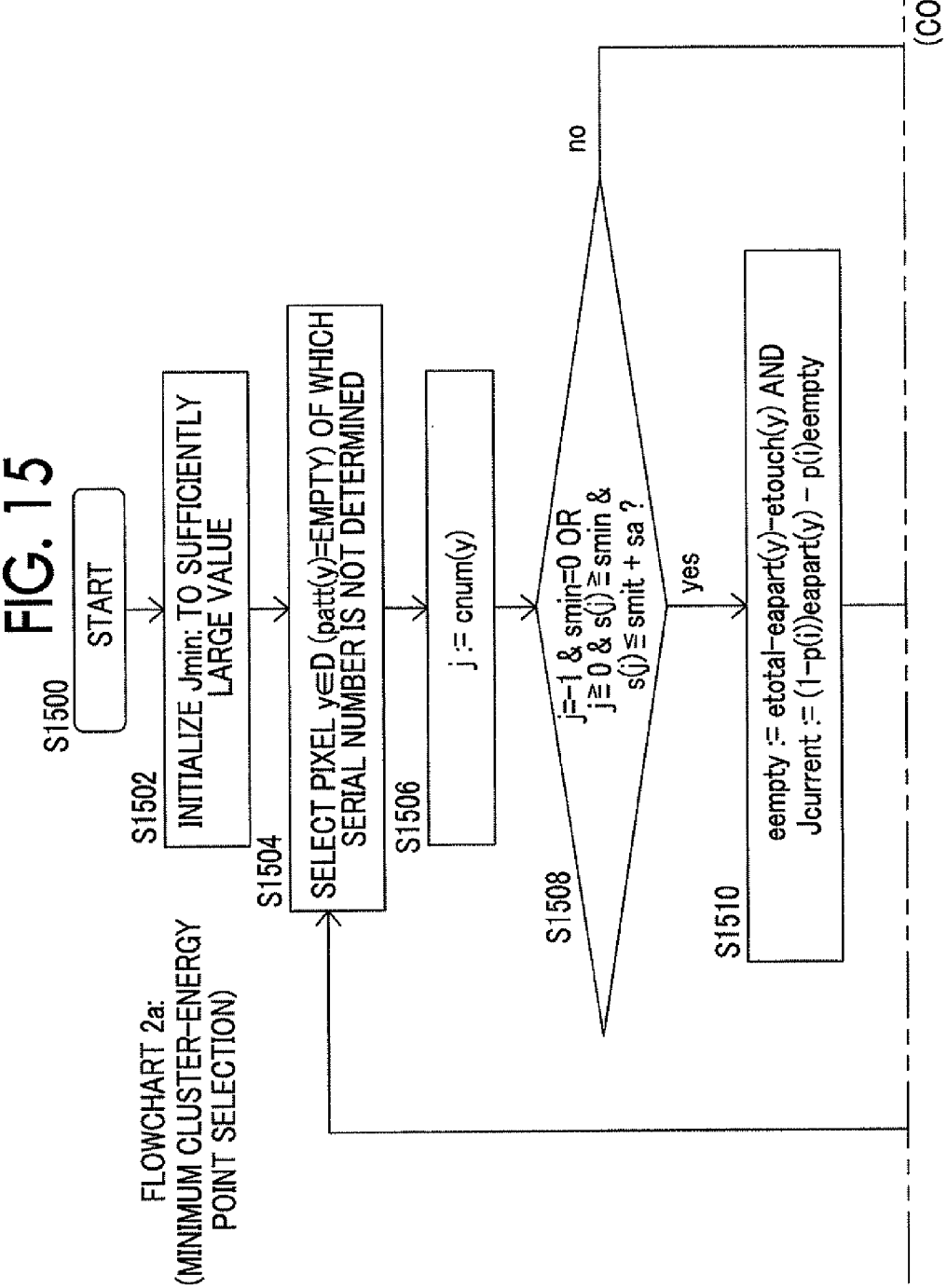

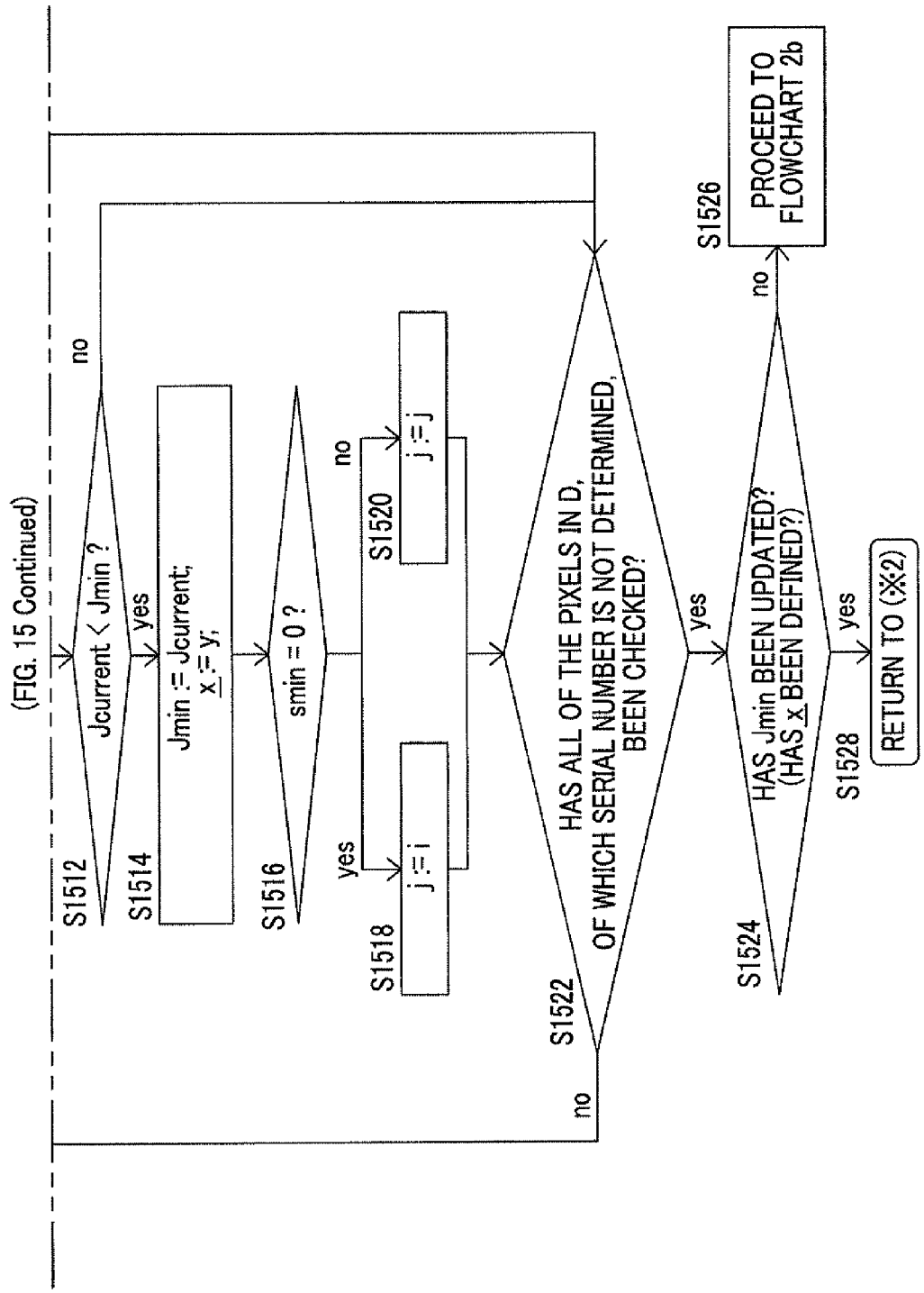

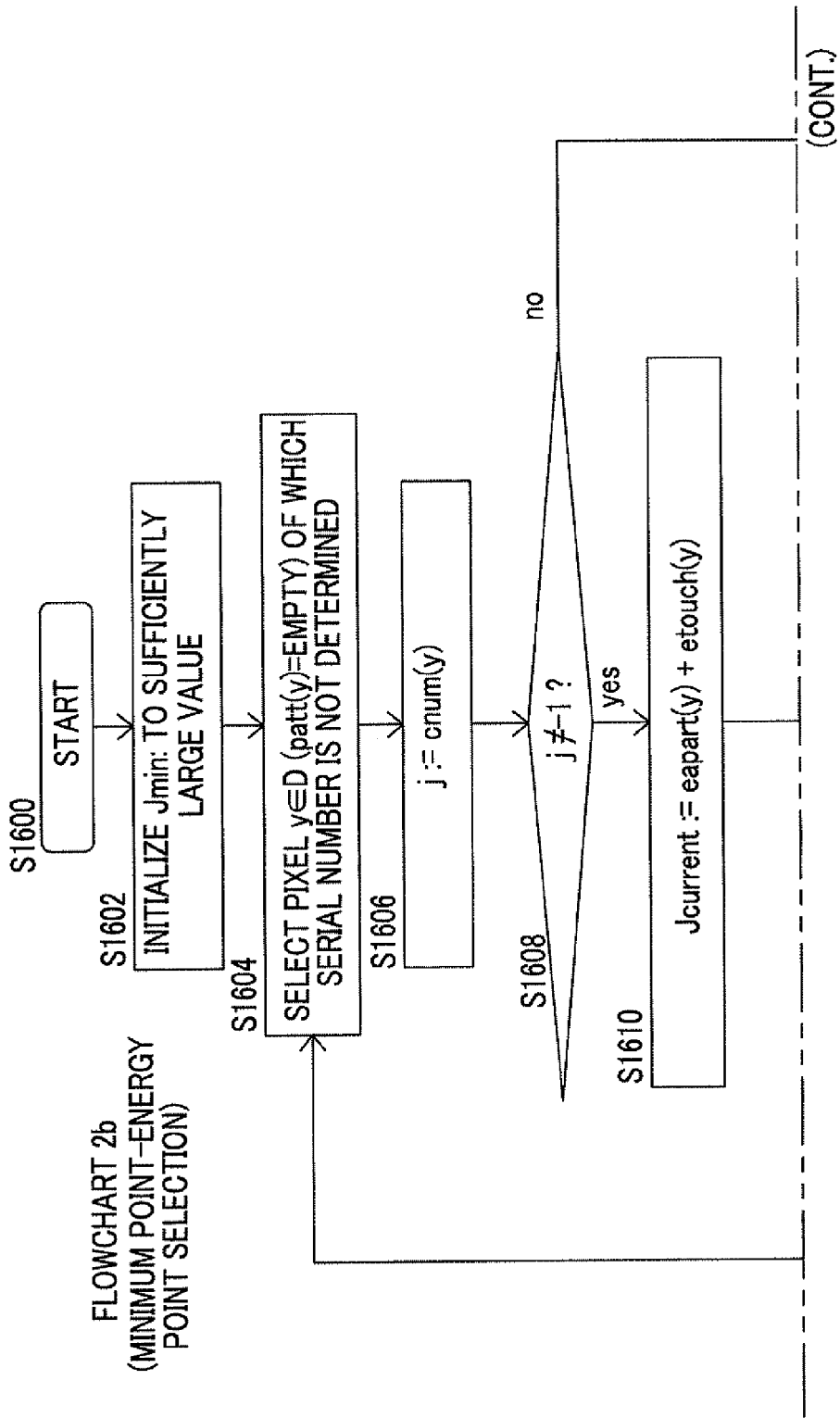

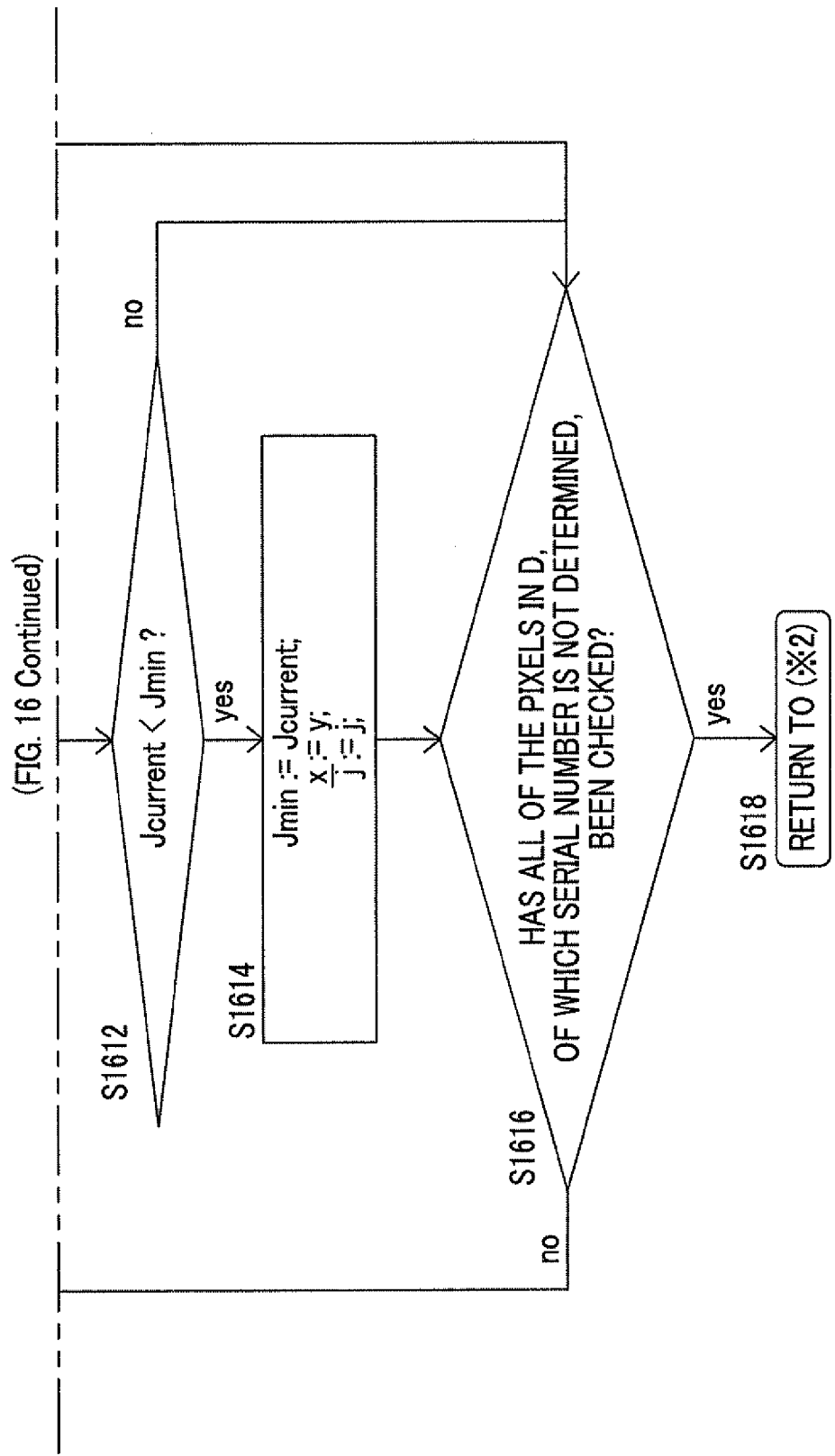

FIG. 19A
FIG. 19B
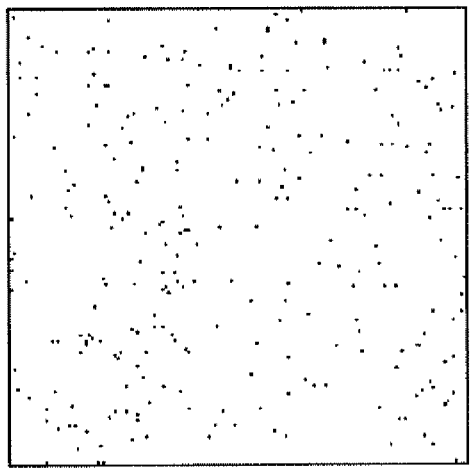
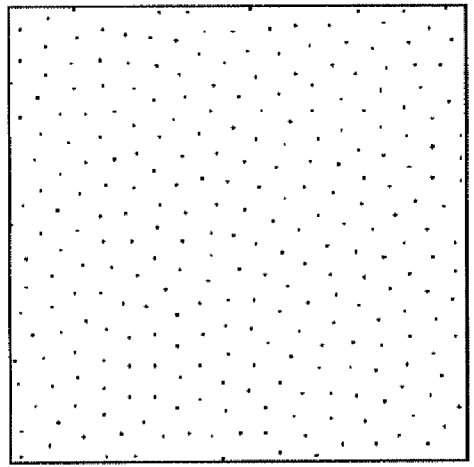

IMAGE PROCESSING MASK CREATING METHOD, NON-TRANSITORY COMPUTER-READABLE RECORDING MEDIUM HAVING IMAGE PROCESSING MASK CREATING PROGRAM RECORDED THEREON, IMAGE PROCESSING DEVICE, AND NON-TRANSITORY COMPUTER-READABLE RECORDING MEDIUM HAVING IMAGE PROCESSING PROGRAM RECORDED THEREON

CROSS-REFERENCE TO RELATED APPLICATIONS

This application is based on and claims priority under 35 USC 119 from Japanese Patent Application No. 2012-057354 filed Mar. 14, 2012.

BACKGROUND

Technical Field

The present invention relates to an image processing mask creating method, a non-transitory computer-readable recording medium having an image processing mask creating program recorded thereon, an image processing device, and non-transitory computer-readable recording medium having an image processing program recorded thereon.

SUMMARY

According to an aspect of the invention, there is provided an image processing mask creating method including: calculating cluster energy of each point in an image processing mask; ranking the points in ascending order or descending order on the basis of the calculated cluster energy values; and allocating threshold values to the points in the image processing mask on the basis of the ranks as the process result of the ranking, wherein the cluster energy is defined as the sum of interaction values $f_r(\|x-y\|)$ having the distance $\|x-y\|$ between a target point x and a point y belonging to a cluster not including the target point x as a parameter.

BRIEF DESCRIPTION OF THE DRAWINGS

Exemplary embodiments of the present invention will be described in detail based on the following figures, wherein:

FIGS. 3A and 3B are diagrams illustrating an example of a halftoning process;

FIG. 4 is a diagram illustrating a classification example of a mask method from the viewpoint of a second factor;

FIGS. 5A to 5D are diagrams illustrating examples of binary images generated using four halftone masks;

FIGS. 6A and 6B are diagrams illustrating examples of the result of a binarization process using two random dispersed-dot halftone masks;

FIG. 7 is a flowchart illustrating an example where serial numbers are generated according to this exemplary embodiment;

FIG. 8 is a flowchart illustrating an example where a minimum cluster-energy point is selected, which is used in the flowchart of FIG. 7;

FIG. 9 is a flowchart illustrating an example where a minimum point-energy point is selected, which is used in the flowchart of FIG. 7;

FIG. 10 is a diagram illustrating an example of the relationship between the points when determining the next serial number i in a state where a serial number i−1 is given;

FIGS. 13A and 13B are diagrams illustrating examples where a binarization process is performed using two types of random clustered-dot halftone masks created according to this exemplary embodiment;

FIG. 14 is a flowchart illustrating an example of a method of accelerating the generation of serial numbers in the flowchart of FIG. 7;

FIG. 15 is a flowchart illustrating an example where a minimum cluster-energy point is selected, which is used in the flowchart of FIG. 14;

FIG. 16 is a flowchart illustrating an example where a minimum point-energy point is selected, which is used in the flowchart of FIG. 14;

FIGS. 19A and 19B are diagrams illustrating an example of arrangement of core points (before and after convergence);

DETAILED DESCRIPTION

Figure 1:
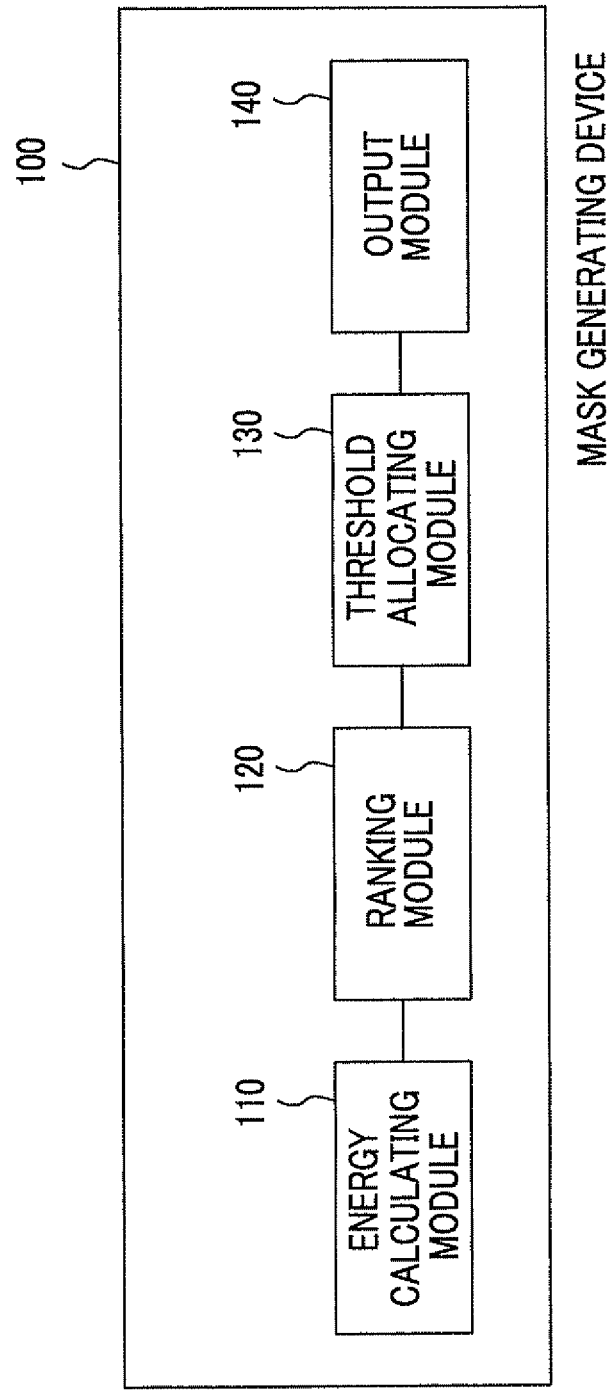
FIG. 1 is a conceptual module diagram illustrating the configuration of conceptual modules according to an exemplary embodiment of the invention.

Prior to description of exemplary embodiments of the invention, background techniques of the exemplary embodiments will be described below.

The description will be given with referring to Non-Patent Documents 1 to 8 as follows.

Non-Patent Document 1: B. E. Bayer, An optimum method for two-level rendition of continuous-tone pictures, Proc. IEEE Int. Conf. Comm., (1973) (26-11)-(26-15)

Non-Patent Document 2: H. R. Kang, Digital Color Halftoning, IEEE Press, New York, 1999

Non-Patent Document 3: K. Ishizaka, New spatial measure for dispersed-dot halftoning assuring good point distribution in any density, IEEE Trans. Imag. Proc., 18(9), (2009), 2030-2047

Non-Patent Document 4: D. L. Lau, G. R. Arce and N.C. Gallagher, "Digital halftoning by means of green-noise masks," J. Opt. Soc. Am. A, 16(7), (1999), 1575-1586

Non-Patent Document 5: V. Ostromoukhov, Pseudo-random halftone screening for color and black & white printing, Proc. 9th Cong. Adv. in Non-Impact Print. Tech., Yokohama, (1993) 579-581

Non-Patent Document 6: V. Ostromoukhov and R. D. Hersch, Stochastic clustered-dot dithering, Journal of Electronic Imaging, 8(4), (1999) 439-445

Non-Patent Document 7: R. A. Ulichney, The void-and-cluster method for dither array generation Non-Patent Document 8: KAJI Mitsuo, Stochastic Screening Techniques and their Surroundings, Journal of printing science and technology, vol. 32, first edition, (1995) 20-27

In the technical field of digital halftoning, there is a technical area of "random clustered-dot halftone masks" The location of this technical area in the halftoning techniques will be first described.

1. Location in Half Toning Techniques

A process of converting an M-valued original image into an N-valued image where M>N is satisfied (where M and N are integers of 2 or more) is referred to as a subtractive color process. When a digital document or image is printed, a subtractive color process is performed so as to match the number of representable tones of an output device. This subtractive color process expressing an M-valued image with an N-valued image is particularly referred to as a (digital) halftoning process (screening or screen process). For example, a combination of M=256 and N=2 or N=4 is a typical example of the halftoning process. FIG. 3A shows an example of an original image of M=256 and FIG. 3B shows an example of a halftone image of N=2 corresponding to the original image. When a color image is half toned, a halftoning process is performed for each plane of CMYK or RGB and the halftoned planes are sequentially superimposed at the time of output to the output device. In many cases, a resolution conversion process (mostly, a resolution increasing process) is performed depending on the output resolution of the output device, before the halftoning process.

1.1 Classification of Halftoning Techniques

Regarding the halftoning techniques according to the related art, reference may be made from Non-Patent Documents 2 and 8 and the like. In this section, by referring in part to these documents, the halftoning techniques according to the related art will be sorted from a comprehensive viewpoint. Although the halftoning techniques are generally sorted from the viewpoint of the flow of time, this sorting tends to take a circuitous route from the mathematical viewpoint. Accordingly, an overview of the halftoning techniques according to the related art will be reviewed in parallel to extract the following three factors, and the entirety will be sorted and classified in a mathematically-simple form.

First factor: processing method
Second Factor: halftone image type
Third Factor: orientation model (evaluation function/creation algorithm in the narrower sense)

These three factors are different factors for achieving improvement in image quality and any half toning technique may be expressed by a combination of the three factors. Intuitively, an idea is possible in which a halftone image of the type determined by the second factor is generated using the processing method of the first factor using a model (evaluation function) determined by the third factor. Hereinafter, the details of three factors will be described on the assumption that a gray image of M=256 is halftoned with N=2 (namely, two values) for the purpose of simplicity. Basically, the same discussion is applied to the case of CMYK images and the case of N>2 (multi-value output), which may require discussions unique to the cases.

1.1.1 First Factor: Processing Method

From the viewpoint of the processing method, the halftoning techniques are broadly classified as follows.

Single-point processing method: one pixel of a binary image is determined from one pixel of an original image Adaptive processing method: one pixel of a binary image is determined from plural pixels of an original image A mask method is a representative example of the single-point processing method. The mask method includes periodically masking an original image with data stored in 2-D matrix, comparing a pair of data between each point of the original image and the corresponding point on the mask, and determining ON/OFF of an output image depending on the magnitude difference, and is widely used due to its fast processing speed. The data stored on the 2-D matrix is called a halftone mask (threshold matrix/dithering mask). The mask method is also called a dither (dithering method), but it should be noted that the term "dither" may be used to mean an error diffusion process to be described later. As a modified method of the mask method, a method (multiple bitmap method) using a (mask) pattern that is defined for each density is known, which is however less frequently used in practice. As another example of the single-point processing method, a method called a density pattern method in which one point of an original image is expressed as a binary image including plural dots, which is however less frequently used in practice in recent years. Accordingly, in the present situation, most of the single-point processing methods may be regarded as a mask method. In the mask method, since the mask creating process itself is basically associated with the image quality of a half toning process, it may be thought that the first element includes the mask creating method itself as well as the mask method.

The adaptive processing method is a method of taking the binary state of adjacent pixels into consideration when binarizing the pixel values of an original image. This method may provide a high-quality image, though the processing load thereof is greater than the single-point processing method. An error-diffusion method is a representative example of the adaptive processing method and is widely used along with the mask method. A method based on an idea similar to the error-diffusion method called a least mean error method is also known. A method called a direct binary search method based on an idea of minimizing a (visual) distance between an original image and a binary image also belongs to the adaptive processing method (this type of method may sometimes be sub-classified as an iterative calculation method).

1.1.2 Second Factor: Halftone Image Type

In general, from the viewpoint of the appearance of an obtained image, the half toning techniques may be broadly classified as follows by a combination of two viewpoints of clustered-dots/dispersed-dots and periodic type/random type.

Periodic clustered-dot halftone: clusters are arranged in a lattice form

Periodic dispersed-dot halftone: isolated dots are arranged in a lattice form

Random dispersed-dot halftone: isolated dots are arranged randomly

Random clustered-dot halftone: clusters are arranged randomly

These four types are arranged in the order of their appearance in history. Traditionally, a clustered-dot halftone technique is a method of expressing the shading through the use of an increase or decrease in area of a cluster, and a dispersed-dot halftone technique is a method of expressing the shading through the use of an increase or decrease in the number of isolated dots. The clustered-dot halftone technique has been known as a halftone screen from the past. Due to the fact that the dispersed-dot halftone technique has been developed after the clustered-dot halftone, the clustered-dot halftone is often referred to as an amplitude modulation (AM) screen and the dispersed-dot halftone is often referred to as a frequency modulation (FM) screen for comparison. Two random halftones in the latter are often collectively referred to as stochastic screens. Traditionally, all the types of random halftones are also referred to as FM screens. The four factors may be applied to the mask method described in the single-point processing method. These four halftones in the mask method will be described later. The adaptive processing method in the first factor is basically oriented to the random halftones and is not normally oriented to the periodic halftones. Accordingly, it may be considered that the mask method is the only effective method that may be applied to (that is worth considering) all the four halftones in the second factor.

1.1.3 Third Factor: Orientation Model (Evaluation Function/Creation algorithm in Narrower Sense)

There is a factor called an orientation model in the half toning techniques. Representative examples thereof include the followings.

Method based on frequency characteristic model (noise characteristics/visual characteristics of human eyes/other mathematical models)

Method based on spatial characteristic model (device output dot reproducibility/device output distortion characteristics/other mathematical models)

Besides the frame of frequency/spatial characteristics, the orientation models may be classified by other frames that are based on the perspective of device dependency or independency. In any case, the lower factor has a substantial meaning. In many cases, respective tone patterns (dot profiles) are generated using an optional algorithm based on an evaluation function that characterizes a model so that the value of the evaluation function has a better value. Accordingly, the evaluation function and the algorithm may be regarded as the substance of the third factor. As above, the algorithm defines an application method of an evaluation function, but if the algorithm itself is directly coupled to a half toning method, it may be natural to regard the algorithm to belong to the category of the first factor. The evaluation function may be directly coupled to the first and second factors, or conversely, the model of the third factor may be considered to match the first and second factors. The third factors may be combined with each other.

As described above, due to the fact that various half toning techniques have been developed at different points of time, it has been often thought that the developments of the half toning techniques are based on the first and second factors. However, in late 1990s, the respective areas of the first and second factors serving as the base are substantially arranged. Thus, in recent years, it has been considered that certain combinations of the first and second factors or the area of the third factor are important for obtaining further developments.

1.2 Properties of Mask Method and Halftone Mask

From the viewpoint of the three factors described in the previous section, this technique may be expressed as follows.

First factor: mask method in single-point processing method

Second factor: random clustered-dot halftone

Third Factor: energy minimization theory

The "energy minimization theory" (one of spatial mathematical models) of the third factor is the core of this technique. Prior to describing this theory, first, an overview of the mask method in the first factor will be described in this section. As described above, the mask method is a method of comparing pairwise the pixels of an original image using a halftone mask, and may be classified into the four types of masks of the second factor depending on the type of an obtained image. First, the relationship between the four types of masks is shown in FIG. 4. A technique example shown in a target area 410 of FIG. 4 is the target of this technique.

FIGS. 5A to 5D show examples of an image halftoned by using these halftone masks. FIG. 5A shows an example of an image that is processed using a periodic clustered-dot halftone mask. FIG. 5B shows an example of an image that is processed using a periodic dispersed-dot halftone mask. FIG. 5C shows an example of an image that is processed using a random dispersed-dot halftone mask. FIG. 5D shows an example of an image that is processed using a random clustered-dot halftone mask. The respective four types of masks will be described below.

1.2.1 Periodic Clustered-Dot Halftone Mask

A periodic clustered-dot halftone mask is a mask that expresses the tone of an original image by the use of the sizes of clusters arranged in a lattice form and has been known as a halftone screen from the past. Since dots are output in a clustered form, it is possible to obtain relatively-stable reproducibility even if an output device has low reproducing performance. Accordingly, the periodic clustered-dot halftone mask has been used in technical areas of printing/digital printing from the past. Here, the clustered form is not necessarily close to a circular form but may be the form of a line or the like. In general, the clustered form means a case where an image is reproduced by periodically clustering multiple dots. The clusters disposed in a clustered form are generally arranged on lattice points. Accordingly, when outputting a color image, the lattice is designed so that an inter-color moiré (low-frequency interference pattern) is suppressed, for example, by using such a lattice that angles such as C:15°, M:75°, Y:0°, and K:45° are allocated to respective color components. The minimum distance between the respective lattice points of the lattice corresponds to the size of a cluster, that is, the output resolution. In general, the resolution is expressed in lines per inch (lpi) and for example, 175 lpi is used. In addition to an orthogonal lattice, any two-dimensional (oblique) lattice including the orthogonal lattice may be used. As described above, since dots are output in a fixed clustered form, it is possible to obtain a stable output, but the periodic clustered-dot halftone mask has drawbacks that the resolution is low and a rosette pattern is perceived as inter-color interference 1.2.2 Periodic Dispersed-Dot Halftone Mask A periodic dispersed-dot halftone mask is a mask that expresses the tone of an original image by the use of an increase and decrease of the number of isolated dots arranged in a lattice form. Since an image is output as isolated dots, it is possible to obtain a higher-resolution output as compared to the clustered-dot halftone mask, but the periodic dispersed-dot halftone mask has drawbacks that a lattice-shaped pattern is conspicuous. In practice, this periodic dispersed-dot halftone mask may be defined as a special case of the periodic clustered-dot halftone mask where the cluster size is 1. Accordingly, the number of types (parameters) of the periodic dispersed-dot halftone mask is smaller than that of the periodic clustered-dot halftone mask. Strictly speaking, the periodic dispersed-dot halftone mask may be regarded as a Bayer mask (Non-Patent Document 1), and the example shown in FIG. 5B is the half toned result by using the Bayer mask.

1.2.3 Random Dispersed-Dot Halftone Mask

A random dispersed-dot halftone mask is a mask that expresses an image by dispersing isolated dots randomly with less distortion. This mask provides a higher resolution than the periodic clustered-dot halftone mask, is relatively robust against interference (moiré) when outputting a color image, and has no concern about a lattice-shaped pattern which appears in the periodic dispersed-dot halftone mask. On the contrary, the random dispersed-dot halftone mask has drawbacks that a textured pattern or a mask periodic pattern is conspicuous, but this mask is frequently used in recent years because the problem with a textured pattern or a cracked pattern has been mitigated with the recent improvement of reproducing performance (mainly, a resolution) of an output device. In particular, in an ink jet printer having an excellent ability to reproduce isolated dots, this mask is widely used together with the error-diffusion method exemplified as the first factor. A blue-noise mask (U.S. Pat. No. 5,111,310) and a void-and-cluster mask (Non-Patent Document 7) are known as an example of this type of mask. In the past, a "sand mesh screen" or the like has been known as a mask having simple random isolated dots. However, this mask may be regarded to be outside the target technique of this invention from the viewpoint of image quality. In this specification, a random type means that dots are dispersed randomly with less distortion. As an expression that conceptually expresses the state of "random and distortion-less isolated dots," the expression of blue noise has been established in the meaning of "white nose with less low-frequency components".

1.2.4 Random Clustered-dot Halftone Mask

A random clustered-dot halftone mask is a mask that expresses an image by dispersing clusters randomly with less distortion and has a property that the mask is robust against moiré like the random dispersed-dot halftone mask. Like the periodic clustered-dot halftone mask, it is possible to obtain relatively-stable reproducibility even if an output device has low reproducing performance. A stochastic clustered-dot halftone mask (Non-Patent Documents 5 and 6) and a green-noise mask (U.S. Pat. No. 6,493,112 and Non-Patent Document 4) are known as an example of this type of mask. As an expression that conceptually expresses the "random and distortion-less clusters", the expression of green noise has been established in the meaning of "white noise with less low- and high-frequency components". Precisely, the green noise as well as the blue noise is defined by the shape of a radially-averaged power spectrum density (RAPSD: radial average profile) of power spectra.

1.2.5 Relationship Between Four Types of Masks

In addition to the four types of masks, a type of mask close to the boundary area between the periodic type and the random type is also known as shown in FIG. 4. When a clustered dot includes a very small number of dots, this mask also has a property close to the dispersed-dot mask and may be said to belong to the boundary area. Briefly speaking, some of irrational tangent screens, a rotated dithering mask, a mask disclosed in Japanese Patent No. 4010097, and the like may belong to this area.

Since different types of mask methods have been developed at different points of time, the naming or concepts, and the like thereof are not established. However, from the mathematical viewpoint other than the historical viewpoint, the mask method may be fixed in the form of the second factor as described above. From the viewpoint of mask design, the mask methods include determining the form of the second factor and then determining the model of the third factor. The random dispersed-dot halftone mask and the random clustered-dot halftone mask may be regarded to directly define the second factor in the broad sense by the use of a frequency characteristic model with a conceptual broad sense such as the blue noise/green noise. However, even when a mask having characteristics close to such a frequency characteristic model may be obtained as a result through mask design, such a frequency characteristic model may not often use for the third factor in practice. Actually, much more approaches to the third factor have been taken in comparison with the first and second factors and thus development/advancement of techniques/image quality have substantially been made in this part. This technique to be described later belongs to this part.

1.3 Properties of Random Clustered-dot Halftone Mask

Hereinafter, the "random clustered-dot halftone mask" which is the main concern of this technique will be described. Due to the fact that the periodic clustered-dot halftone mask is called an AM screen and the random dispersed-dot halftone mask is called an FM screen, the random clustered-dot halftone mask is often called an AM-FM hybrid screen in some cases. As described above, the random clustered-dot halftone mask is roughly classified into two types, that is, a stochastic clustered-dot halftone mask and a green-noise mask. The properties of these two types will be described below.

1.3.1. Stochastic Clustered-Dot Halftone Mask (Non-Patent Documents 5 and 6)

The random clustered-dot halftone mask which is practically available is considered to be first reported in Non-patent Document 5 by Ostromoukhov in 1993. The reported technique was reported again as a stochastic clustered-dot halftone mask (Non-patent Document 6) with improvement. The technique is based on an idea that "core points" are arranged in a mask randomly with less distortion, the shape of a cluster including each core point is determined using Voronoi polygon tessellation, and then a threshold values are allocated so that the clusters gradually grow. The technique described in Japanese Patent No. 3427026 may be regarded as a technique in the area of the stochastic clustered-dot halftone mask. With an idea similar to the Ostromoukhov method, a mask is divided into polygons through the Voronoi polygon tessellation and clusters are made to grow from Voronoi points using the divided polygons as halftone cells. The techniques described in Japanese Patent No. 4168033 and Japanese Patent No. 4143560 are regarded to belong to this area, but the frequency characteristic model and the like are also used.

1.3.2. Green-Noise Mask (U.S. Pat. No. 6,493,112 and Non-Patent Document 4)

Then, in 1999, a type of mask slightly different from the stochastic clustered-dot halftone mask has been reported with the name of green-noise mask by Arce, Lau, et al. This method employs the idea of the blue-noise mask which is a representative example of the random dispersed-dot halftone mask and may be simply said to a "cluster version of the blue-noise mask". That is, isolated dots are gradually turned on in the blue-noise mask, but clusters with a predetermined size are gradually turned on in the green-noise mask. Broadly speaking in frequency characteristics, the concept of "cluster with a predetermined size" corresponds to a "medium frequency band", compared with the blue noise which is a collective name of isolated dots=high frequency, and the term, "green noise", is used as a word corresponding to the area.

1.3.3. Difference Between Two Methods and General Problem

Since both the stochastic clustered-dot halftone mask and the green-noise mask have a random clustered structure, both provide visually similar results. In practice, almost the same level may be provided in some densities. However, the stochastic clustered-dot halftone mask is based on the flow of the AM screen that "a cluster grows", but the green-noise mask is based on the flow of the FM screen that "the number of dots increases" by considering a cluster as a dot. Actually, the stochastic clustered-dot halftone mask has no basic variation in peak frequency component with an increase in density, but the green-noise mask has a feature that the peak frequency component gradually moves to the high frequency side.

The random halftone masks have a feature that the clustered dots have broader adjustment factors and more easily stabilize image quality, compared with the dispersed dots. Accordingly, the clustered dots have a higher degree of freedom in creating mask than the dispersed dots. However, the model of the third factor may affect the image quality and the related art has possibility of textured pattern or periodic pattern actualization of the mask, compared with the periodic clustered-dot halftone. Accordingly, there is a need for creating a mask with better model/algorithm. As described in Non-patent Document 5 and Japanese Patent No. 3427026, the concept that clusters are made to grow isotropically so as to uniformly cover the Voronoi polygons with the Voronoi points as core points is a natural idea, but the condition that clusters grow isotropically from the core points is neither a necessary condition nor a sufficient condition in consideration of image quality in at least a single color, and there is a possible capable of more improving the image quality in the technical areas of the stochastic clustered-dot halftone mask, from the mathematical viewpoint.

2. Method of Creating Random Dispersed-Dot Halftone Mask Using Energy

In this technique, a random clustered-dot halftone mask is created using energy that is mathematically properly defined. Prior to describing this method, a method of creating a random dispersed-dot halftone mask using energy will be described for reference.

2.1. Creation of Random Dispersed-Dot Halftone Mask

Hereinafter, a method of creating a random dispersed-dot halftone mask using energy and the definition of energy will be described briefly.

2.1.1. Creation Algorithm

In creating a random dispersed-dot halftone mask, threshold numbers $0, \ldots,$ and $l-1$ are allocated to all the points in a threshold matrix with a size of $w \times h$ through the following process.

1. Serial numbers $0, \ldots,$ and $wh-1$ are allocated in the order of minimizing energy.
2. Respective serial numbers are divided by $wh/l$.

Here, "l" is a required number of tones and $l=256$ or the like is preferably used. When a point to which serial number $i \in \{0, \ldots, wh-1\}$ is allocated is selected from the threshold matrix, a point having the lowest energy value is selected from points to which serial numbers are not allocated and then serial number i is allocated to the selected point. In this case, the energy value is calculated for the points to which serial numbers $0, \ldots,$ and $i-1$ are allocated. The energy at each target point is a value defined as an averaged sum of a function having a distance between the target point and another point as a variable among all allocated points. Intuitively speaking, the energy exhibits such a property that the further a point located apart from the target point, the smaller the energy value at the point (the less the point is affected). As shown in the examples of FIGS. 6A and 6B, it may be understood that the binary image obtained using a dispersed-dot halftone mask (see FIG. 6B) generated by the method of this technique has a less textured pattern than the binary image obtained using the void-and-cluster method (see FIG. 6A) according to the related art. The void-and-cluster method is based on a void/cluster distinguishing model using a Gaussian filter from the viewpoint of the third factor, and is regarded as a standard method of the random dispersed-dot halftone mask from the viewpoint of image quality.

2.1.2 Definition of Energy (Point Energy)

The energy used to create the random dispersed-dot halftone mask in the previous section will be described below. This energy is also used to create a random clustered-dot halftone mask in this technique to be described later and is referred to as point energy therein for the purpose of convenient explanation. This is intended to distinguish the point energy from the energy mainly used to create a random clustered-dot halftone mask, which is referred to as cluster energy.

The point energy $I(X, X, f_r)$ at a point $x \in X$ is defined as Expression 1, where a point set in a subset $[0, w) \times [0, h)$ of a two-dimensional plane is defined as X. Points x, y, and z in the following description are all two-dimensional vectors and are specified by coordinate values such as $x=(x_1, x_2)$.

Expression 1

$$I(X, x, f_r) = \frac{1}{|X|} \sum_{y \in X} f_r(\|x-y\|) \tag{1}$$

Here, $f_r(\|x-y\|)$ represents an interaction value acting between two points x, $y \in X$ and r is a subscript representing that the interaction value is 0 when $\|x-y\| > r$.

$|X|$ represents the total number of points in the point set X. The distance $\|\cdot\|$ represents a periodic boundary distance in a space $[0, w) \times [0, h)$ and is defined by Expression 2.

Expression 2

$$\|x-y\| = \min\left\{ \left\| x-y + \begin{pmatrix} w & 0 \\ 0 & h \end{pmatrix} e \right\| : e=(e_1, e_2), e_1, e_2 = -1, 0, 1 \right\} \tag{2}$$

The point energy I defined as described above represents the average of $f_r$ values between a target point $x \in X$ and a point $y \in X$ (including x) within a radius r from x.

In order to satisfactorily obtain uniform and isotropic point dispersion by minimizing the point energy of each point x in the set X, it is necessary to give mathematically-secured conditions to the function $f_r$. For the purpose of simplification of notations, the function is notated by Expression 3 by introducing an energy influence radius $r>0$ (constant) and normalizing the function with a function h defined on the interval $[0, 1]$.

Expression 3

$$f_r(x) = \begin{cases} h(x/r) & x < r \\ 0 & x \geq r \end{cases} \tag{3}$$

Here, in order to secure the uniform and isotropic point dispersion, it is necessary to impose the following three conditions thereto.

H1: h is a monotonically-decreasing convex function of a $C^2$ class

H2: $h(1)=\lim_{x\to 1}h'(x)=0$

H3: $(h''(x^{1/2})/(x^{1/2}))^p$ is a convex function (potentially $p=\frac{1}{2}$)

An example of h satisfying these conditions is Expression 4.

$$h(x)=(\tfrac{2}{3}-x+\tfrac{1}{3}\cdot x^3)^2 \tag{4}$$

Briefly speaking, this means an image in which as points get farther from each other, the interaction value $f_r$ acting between the points decreases and the energy becomes smaller. In order to secure it mathematically, the conditions H1 to H3 are necessary. By using a function h satisfying this definition, it is possible to secure that "a minimum-energy state is a point dispersion in which points are uniformly distributed". The energy at each point x may be calculated using the energy value of Expression 5 instead of $I(X, x, f_r)$.

Expression 5

$$J_1(X, x, f_r) = \sum_{y\in X, y\neq x} f_r(\|x - y\|). \tag{5}$$

Here, J1 represents the summation of $f_r$ values of a target point $x \in X$ and another point $y \in X-\{x\}$ within the radius r from x.

3. Configuration of Exemplary Embodiment

Hereinafter, an exemplary embodiment of the invention will be described with reference to the accompanying drawings.

FIG. 1 is a conceptual module diagram illustrating the configuration of modules according to this exemplary embodiment.

In general, a module represents software (computer program) which may be logically separated or hardware components. Accordingly, a module in this exemplary embodiment means a hardware module in addition to a module in a computer program. Therefore, this exemplary embodiment provides a computer program (such as a program causing a computer to perform respective sequences, a program causing a computer to function as respective units, and a program causing a computer to perform respective functions) which functions as such modules, a system, and a method. For the purpose of convenience of explanation, terms of "be stored" and "store" and terms equivalent thereto are used. Such terms mean to store something in a storage unit or to control something to be stored in a storage unit when the exemplary embodiment is a computer program. The modules may correspond to the functions in a one-to-one manner. From the viewpoint of mounting, one module may be constructed by one program, plural modules may be constructed by one program, or one module may be constructed by plural programs. Plural modules may be executed by one computer or one module may be executed by plural computers which are distributed or arranged in parallel. A module may include another module. Hereinafter, the term, "connection", is used for logical connection (reception of data, instruction, cross-reference between data, and the like) in addition to physical connection. The term, "predetermined", means that something is determined previous to a process to be performed and also means that something is determined depending on the circumstances at that time or depending on the circumstances or states up to now even after the flow of processes according to this exemplary embodiment is started but before a target process to is performed, in addition to before the flow of processes according to this exemplary embodiment is started. If plural "predetermined values" are present, the plural predetermined values may be different from each other or two or more values thereof (including all the predetermined values) may be equal to each other. The description, "if A, B is performed", means that "it is determined whether A, and B is performed when A is determined". Here, a case where the determination on whether A is not necessary is excluded.

A system or an apparatus includes a configuration which is implemented by a single computer, hardware, apparatus, or the like in addition to a configuration in which plural computers, hardware, apparatuses are connected to each other via a communication unit such as a network (including a one-to-one communication connection). An "apparatus" and a "system" are used as a term having the same meaning. A "system" does not include an artificially-determined social "structure" (social system).

When plural processes are performed by each module or in each module, target information is read from a storage unit, the process is performed, and then the process result is written to the storage unit, for each process. Accordingly, the reading from a storage unit before the process or the writing to the storage unit after the process may not be described. Herein, the storage unit may include a hard disk, a RAM (Random Access Memory), an external storage medium, a storage unit via a communication line, and a register in a CPU (Central Processing Unit).

An image processing mask (hereinafter, also simply referred to as a mask) creating device according to this exemplary embodiment serves to create an image processing mask and includes an energy calculating module 110, a ranking module 120, a threshold allocating module 130, and an output module 140, as shown in FIG. 1. Here, the image processing mask is used to convert a multi-tone image into a halftone image (to perform a subtractive color process). Particularly, the image processing mask is a "random clustered-dot halftone mask" created using an energy minimization theory. That is, the image processing mask creating device creates a "random clustered-dot halftone mask".

The energy calculating module 110 is connected to the ranking module 120. The energy calculating module 110 calculates cluster energy of each point in an image processing mask. The cluster energy is defined as the sum of interaction values $f_r(\|x-y\|)$ having the distance $\|x-y\|$ between a target point x and a point y belonging to a cluster not including the target point x as a parameter. The cluster energy may be also defined as the weighted average of the negative sum of interaction values $f_r(\|x-y\|)$ having the distance $\|x-y\|$ between a target point x and a point y belonging to a blank area as a parameter. The function $f_r$ may be determined by a second-order differentiable function having predetermined strength convexity. The energy calculating module 110 may randomly arrange K cluster core points in the image processing mask and may create the cluster by energy drop. The energy calculating module 110 may invert the formation of clusters from black to white or from white to black with a predetermined density. For example, the image processing mask is a rectangle (matrix) having a size of w×h. In this case, the core points are made to grow while giving serial numbers 0 to wh−1 to the core points in the order of minimum cluster energy by the ranking module 120 and then the threshold values are allocated to 0 to 1-1 (where 1 is the number of gray levels to be acquired) by the threshold allocating module 130.

The ranking module 120 is connected to the energy calculating module 110 and the threshold allocating module 130. The ranking module 120 ranks the points in ascending order or descending order on the basis of the values of the cluster energy calculated by the energy calculating module 110.

The threshold allocating module 130 is connected to the ranking module 120 and the output module 140. The threshold allocating module 130 allocates threshold values in the image processing mask on the basis of the ranks determined by the ranking module 120.

The output module 140 is connected to the threshold allocating module 130. The output module 140 outputs the image processing mask to which the threshold values are allocated by the threshold allocating module 130. Here, the meaning of "output the image processing mask" includes, for example, transmitting the image processing mask to another image processing device (a printing machine such as a printer) and writing the image processing mask to a storage unit (including storage mediums such as a memory card).

Figure 2:
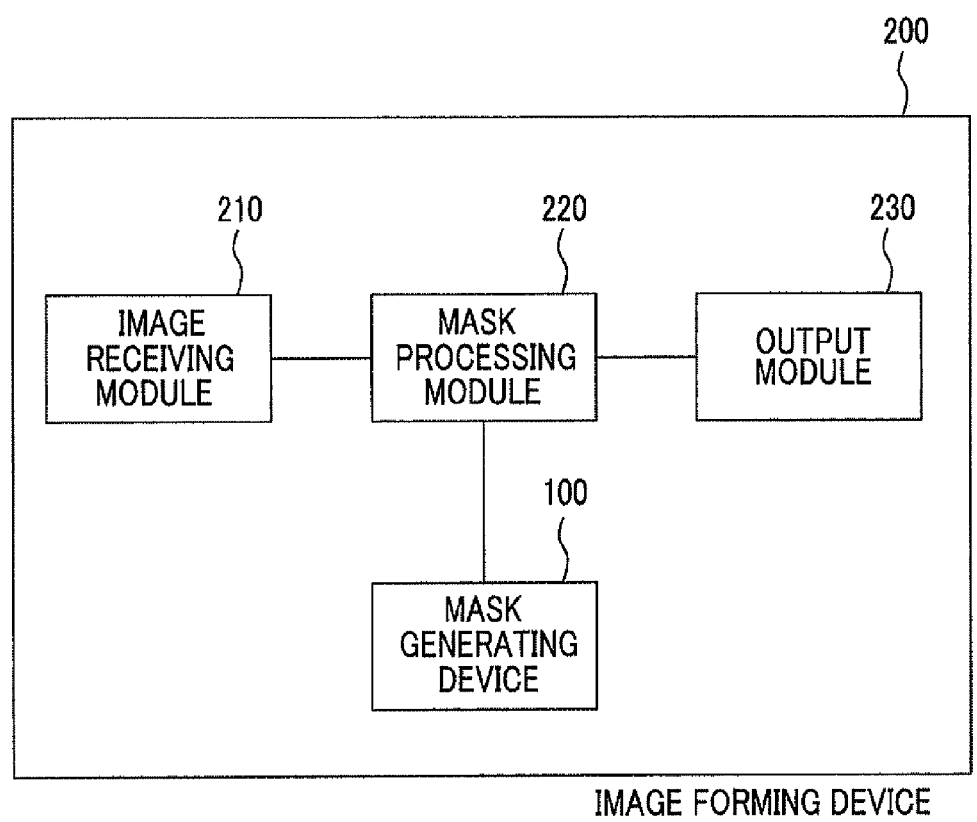
FIG. 2 is a module diagram illustrating a system configuration when this exemplary embodiment is applied to an image forming apparatus.

FIG. 2 is a module diagram illustrating a system configuration when this exemplary embodiment is applied to an image forming apparatus 200.

The image forming apparatus 200 includes an image receiving module 210, a mask processing module 220, an output module 230, and a mask creating device 100, as shown in FIG. 2. The image forming apparatus 200 halftones a multi-tone image by the use of an image processing mask. The image forming apparatus 200 may include a mask storage module that stores the image processing mask created by the mask creating device 100, instead of the mask creating device 100.

The image receiving module 210 is connected to the mask processing module 220 and serves to receive an image and to send the received image to the mask processing module 220. The receiving of an image includes reading an image, for example, by the use of a scanner or a camera, receiving an image via a communication line from an external device through the use of a facsimile, and reading an image stored in a hard disk (which is built in a computer but which includes a hard disk connected thereto via a network) or the like. The image is a multi-tone image (including a color image). The number of received images may be one or two or more. The contents of the image may include documents used for business and pamphlet for advertisement.

The mask processing module 220 is connected to the image receiving module 210, the output module 230, and the mask creating device 100 and creates a halftone image by performing a mask processing operation of comparing pixel values of the multi-tone image with the threshold values in the image processing mask created by the mask creating device 100 on the multi-tone image received by the image receiving module 210. The image processing mask supplied from the mask creating device 100 may be an image processing mask created as described above. Alternatively, image processing masks created in advance by the mask creating device 100 may be stored and one of the stored image processing masks may be selected and supplied in response to a request from the mask processing module 220.

The output module 230 is connected to the mask processing module 220 and serves to receive a halftone image created by the mask processing module 220 and to output the received image. The outputting of an image includes printing the image with a printing machine such as a printer, displaying the image with a display device such as a display, transmitting the image with an image transmitting device such as a facsimile, writing the image to an image storage device such as an image database, and sending the image to another information processing device.

4. Creation of Random Clustered-Dot Halftone Mask in this Technique

The technique used in this exemplary embodiment is a technique of creating a mask belonging to the stochastic clustered-dot halftone mask type out of two types of random clustered-dot halftone masks and has the following features.

The shape (halftone cell) of a cluster such as a Voronoi polygon is not designated, which is normally performed with a stochastic clustered-dot halftone mask.

The cluster is made to grow using mathematically-proper energy.

It is possible to raise the degree of freedom in growth of a cluster in a mask by not performing the designation of the shape of a cluster. It is also possible to create a mask without performing cell division or frequency conversion. Then, it is possible to obtain the optimal result in image quality due to the effect of the mathematically-proper energy with these properties.

4.1. Basic Configuration (Example 1)

Hereinafter, the method of creating a random clustered-dot halftone mask according to this technique will be described. By uniformly giving serial numbers of 0 to wh−1 to data (hereinafter, referred to as points or pixels) in a threshold matrix as in the random dispersed-dot halftone mask and finally dividing the data values, for example, by wh/l, the threshold values of 0 to l−1 are allocated to the pixels in the mask and the threshold matrix is created. The concept of energy is used to implement a cluster distribution which is random with less distortion when the points are turned on in the order of the serial numbers.

4.1.1 Step 1: Preparation

First, parameters or memories necessary for creating a mask are prepared and initialized.

The parameters are defined as follows.

(w, h): mask width and height (unit: pixels)

$L_d$: resolution of output device (unit: dpi)

$L_o$: corresponding resolution (which is reproducible by the mask finally created) (unit: lpi)

$K=\text{INT}(wh \cdot (L_o/L_d)^2 + 1)$: total number of core points (unit: pieces)

r: energy influence radius (unit: pixels)

$f_r$: interaction value function (defined by Expression 3 using the function h satisfying the conditions H1 to H3)

Here, $L_d$ represents the resolution of an output device and has a unit of lines per inch. $L_o$ represents a desired resolution at the time of output to a device and similarly has a unit of lines per inch. In general, the corresponding resolution $L_o$ when K core points are arranged in a mask of a size (w, h) and an image is output with a resolution $L_d$ (dpi) is defined by Expression 6.

Expression 6

$$L_o = L_d \sqrt{\frac{K}{wh}} \qquad (6)$$

Accordingly, when Lo is preliminarily given, K may be determined through the reverse calculation of the above-mentioned expression. INT(x) represents a function of returning the integer part of x. The total number of core points K has a direct influence on the resolution (the corresponding resolution) of the mask finally created. As the value of K increases, more core points are arranged in the mask and thus the output resolution is raised as a result. On the contrary, when the value of K decreases, the resolution is lowered. The energy influence radius (real value) r is defined to satisfy 0<r≤min{w, h}/2 but is generally set to a large value. When a large value is set, the calculation load of calculating the energy increases, but it is possible to consider energy in a broader range and thus to reduce the distortion in the mask. The function h for determining the interaction value has only to satisfy the conditions H1 to H3, but a function having unnecessarily-strong convexity should not be designated. By determining r and h, the function $f_r$ is determined.

Examples of the above-mentioned parameters include w=h=160, $L_d$=2400, and $L_o$=250. In this case, K=278 is derived. That is, by arranging randomly and uniformly 278 core points in a 160×160 matrix, it is possible to create a random clustered-dot halftone mask with a resolution corresponding to 250 lpi by the use of an output device with 2400 dpi. The function fr is defined by Expression 3, for example, using $h(x)=(\frac{2}{3}-x+\frac{1}{3}\cdot x^3)^2$ of Expression 4 and r=48.0. Alternatively, r=m{w, h}/2=80.0 may be set.

The definition and preparation/initialization of a memory is performed as follows.

BLACK=0, WHITE=1, and EMPTY=2 are defined.

D={0, ..., w−1}×{0, ..., h−1}: mask domain (memory size)

v(i): point (with x and y coordinates) in D corresponding to serial number i=0, ..., wh−1
   initialization is not necessary cnum(x): cluster number to which each point x∈D belongs
   all the points x∈D are initialized into cnum(x)=−1 patt(x): binary pattern of each point x∈D
   all the points x∈D are initialized into patt (x)=EMPTY th(x): threshold value in threshold matrix for each point x∈D
   initialization is not necessary In Step 2 described below, uniform serial numbers 0, ..., wh−1 are given to the mask of a w×h size. If necessary, in Step 3, the serial numbers are allocated to the values in the range of 0, ..., l−1, which are the threshold values of the final threshold matrix. When a point x∈D to which a serial number should be given is determined, v(i) is a memory storing the position of the point. Further, cnum(x) is used as a memory used to store/refer to the cluster to which x belongs when uniform identification numbers of 0 to K−1 are given to the K core points and then serial numbers are given to the points x∈D. patt(x) is a memory used to update a binary pattern in which all the points v(i) with the serial numbers of 0 to i−1 attached thereto are turned on at the time of creating the serial numbers i. In addition, necessary memories may be sequentially secured and used. From the viewpoint of treatment, it is preferable that v(i) be managed as a two-dimensional memory and cnum(x), patt(x), and th(x) be managed as one-dimensional memories.

In this technique, two types of energy values $J_1$ and $J_2$ defined by the interaction value function $f_r$ are calculated and used in Step 2, but are assumed to be called as follows for the purpose of avoiding explanatory confusion.

$J_1$: point energy (Expression 5)
$J_2$: cluster energy (Expression 7 to be described later)

$J_1$ is described already in Expression 5 associated with the creation of a random dispersed-dot halftone mask. The definition of $J_2$ will be described later. It is noted that the term, "energy", is generally used as a generic concept including them.

4.1.2. Step 2: Process of Allocating Serial Numbers 0, ..., wh−1

Uniform serial numbers 0, ..., wh−1 are given to all points. Internal parameters/memories described below are prepared therefor.

$s_a$: margin of cluster size s(j): total number of points constituting clusters for cluster numbers j=0, ..., K−1
   initialized into s(j)=0

$s_{min}$: minimum number of points constituting the present cluster
   initialized into $s_{min}$=0

The margin of a cluster size $s_a$ represents the error allowable in the total number of points constituting the clusters when the clusters are made to grow from the core points and $s_a$=1 is generally set, but the margin of a cluster size may be changed to a greater value in some cases. The allocation of the serial numbers is performed through the process shown in FIG. 7.

Step 2 is characterized in that a next serial number i is allocated to the point having the minimum cluster energy out of the points in contact with the clusters arranged already in a state where the serial numbers 0 to i−1 are uniformly given to the points in D. Conceptually, the cluster energy of a point x is defined as the sum of the interaction values having the distance between a point x (x in FIG. 10 to be described later) and a "point y in a cluster (black point in FIG. 10) to which x does not belong" as a parameter. Therefore, the overall flow will be first described conceptually and then the detailed definition of the cluster energy will be described in the subsequent section.

A process of uniquely determining the serial numbers i=0, ..., wh−1 in D will be described with reference to Flowchart 1 shown in FIG. 7.

First, in S702, the value of i is initialized into i=0. In S704, a point x having the minimum cluster energy is selected out of the points to which the serial numbers are not given yet in D and which are in contact with the clusters arranged already. The details of selecting a point having the minimum energy will be described later with reference to Flowchart 1a shown in FIG. 8 and Flowchart 1b shown in FIG. 9. (Here, the "points in contact with the clusters arranged already" has a global meaning and this contact condition is not taken when i=0, ..., K−1, that is, when the first point of the cluster is not formed. This will be described with reference to FIGS. 8 and 9.) When the point x having the minimum energy is selected in S704, an updating process necessary for determining the next serial number i+1 is performed in S706. Specifically, the updating in S706 is performed as follows.

patt(x)=BLACK: the point having the serial number i given thereto is newly updated in the binary pattern at the present time (a pattern in which the points having the serial numbers 0, ..., i−1 given thereto are turned on)

v(i)=x: the point having the serial number i given thereto is stored cnum (x)=j: cluster number to which the point having the serial number i given thereto belongs is registered s(j)=s(j)+1: total number of points constituting the cluster to which the point having the serial number i given thereto belongs is updated $s_{min}$=min{s(i): i=0, ..., K−1}: minimum number of points constituting the cluster at the time of giving the serial number is updated When the updating process of S706 is ended, the serial number is updated into i:=i+1 in S708. In S710, it is determined whether i=wh. When it is determined that i=wh, all the serial numbers are considered to be set and the flow of processes is ended. When it is determined that i<wh, the flow of processes is repeatedly performed from step S704 so as to give a next serial number.

In this way, the serial numbers i=0, ..., wh−1 are uniquely determined in the given D.

By allocating these serial numbers to the threshold values 0, . . . , 1−1 in Step 3 to be described later, the final threshold matrix is determined. Prior to description thereof, the specific process of selecting the point having the minimum energy in step S704 will be described below.

The method of selecting a point x having the minimum cluster energy out of the points to which the serial numbers are not given yet in D and which are in contact with a cluster arranged already will be described with reference to Flowchart 1a shown in FIG. 8.

First, in S802, $J_{min}$ is initialized into a sufficiently large value. For example, $J_{min}$=1000000 is set. In S804, a point y to which a serial number is not given in D is taken. For example, D may be sequentially scanned from the upper-left side to the lower-right side and the point y may be sequentially set.

Subsequently, in S806, when the point y is in contact with a cluster, the cluster number is acquired. When such a contact is present, it is noted that the contact points of the clusters are points to which one of the serial numbers 0 to i−1 is given already on the basis of the definition. Specifically, in S806, when points z∈T (y) to which the cluster number cnum is given are present in a set of four points T(y) (within the periodic boundary distance ||•||) in contact with the point y in four directions (up, down, left and right), one point z thereof is taken and j=cnum(z) is set. When the point y is not in contact with any cluster, j=−1 is set.

In S808, it is checked whether the selected point y satisfies the conditions of candidate points for regulating the cluster size and causing a cluster to grow. Only when the check result is affirmative, the point y is considered as a candidate point and the energy thereof is calculated in S810 and in steps subsequent thereto. Specifically, in S808, the energy is calculated only when two conditions described below are provided and any one of the two conditions is satisfied.

The first point constituting a cluster is not arranged yet and the point y is not in contact with any cluster arranged already, that is, j=−1 and $s_{min}$=0 are satisfied for the point y.

The point y is in contact with a cluster arranged already and the number of pixels constituting the cluster is in the allowable range, that is, j≥0, s(j)≥$s_{min}$, and s(j)≤$s_{min}$+$s_a$ are satisfied for the point y.

When any of the above-mentioned conditions is satisfied in S808, the process of S810 is performed. In S810, a point set $X_i$ is set to include all the points to which the serial numbers 0, . . . , i−1 are given already and the cluster energy $J_2$ of the point y between the points in $X_i$ is calculated and is substituted for $J_{current}$. The detailed method of calculating $J_2$ will be described later. When i<K, the cluster energy $J_2$ is substantially equal to the point energy $J_1$.

Subsequently, in S812, when $J_{current}$<$J_{min}$, it is determined that the energy of the selected point y is smaller. In S814, $J_{min}$ is updated to $J_{current}$ and the candidate point x having the minimum energy is updated to x:=y.

When $s_{min}$=0 is determined in S816, the cluster number of the point y is newly registered as j=i in S818. That is, since all the clusters are not formed at $s_{min}$=0, the serial number is registered as the cluster number every when determining a new core point of a cluster.

On the other hand, when $s_{min}$≠0 is determined in S816, it means that at least one point for any of the K clusters is arranged. Accordingly, in S820, a new cluster number is not given but the cluster number j of the cluster in contact with the point y is taken and j=j is set.

In S822, it is determined whether the above-mentioned processes are performed on all the pixels in D of which the serial number is not determined. When the determination result is negative, the process of S804 is repeatedly performed on a next candidate point y. (When the conditions of S808 or S812 are not satisfied, the process on the selected candidate point y is stopped and the same determination process of S822 is performed.)

When it is determined in S822 that the processes are performed on all the pixels in D, the point x having the minimum energy and the cluster number j to which the point belongs are acquired. However, when the value of i is a large value close to wh, the point having the minimum energy may not be selected from the points satisfying the limitation of the cluster size such as s(j)≥$s_{min}$ and s(j)≤$s_{min}$+$s_a$. In consideration of this case, it is determined in S824 whether the value of $J_{min}$ is updated. When it is determined that the value of $J_{min}$ is not updated, the point having the minimum cluster energy may be acquired again in a state where the limitation of the cluster size such as s(j)≥$s_{min}$ and s(j)≤$s_{min}$+$s_a$ is excluded, or the point having simply the minimum point energy may be acquired through Flowchart 1b (S826) shown in FIG. 9, whereby x and j are determined. When the value of $J_{min}$ is updated, it means that at least one candidate point x having the minimum energy is defined. On the contrary, only when the value of $J_{min}$ is not updated, it means that a candidate point having the minimum energy is not determined.

Finally, in S828, the acquired x and j are provided to Flowchart 1 shown in FIG. 7 and the process of giving a serial number i subsequently to S706 is performed. This is described above.

An example of the process of re-determining a candidate point having the minimum energy when a candidate point having the minimum energy is not acquired in S824 is shown in Flowchart 1b shown in FIG. 9. When a point having the minimum cluster energy is not selected so as to satisfy the conditions such as the number of pixels constituting a cluster, a point having the minimum point energy is selected in Flowchart 1b. The overall flow is the same as Flowchart 1a shown in FIG. 8 and thus description thereof will not be repeated. However, it is noted that in Flowchart 1b, since the limitation of contact with a cluster is excluded and the point having the minimum point energy is selected, it is not necessary to check the contact with a cluster. For example, when j≠−1 in the determination process of S908, that is, when a point is in contact with a cluster (regardless of the contact destination), the point is set as a candidate point for calculating the point energy.

In this way, the reason of re-acquiring a point having the minimum point energy when a point having the minimum cluster energy is not acquired is that a point having the minimum cluster energy may be acquired in most cases and it is efficient that a point having the minimum point energy is selected only when it fails. For example, the common part of the flowchart shown in FIG. 8 and the flowchart shown in FIG. 9 may be shared. In this case, the efficiency degrades but the performance does not vary.

4.1.3 Definition of Cluster Energy

The calculation of the cluster energy $J_2$ will be described in detail with reference to FIG. 10. When selecting the i-th point, the following set is firstly defined for the purpose of convenience.

$X_i$={x∈D: patt (x)=BLACK} (all the points to which the serial numbers 0, . . . , i−1 are given already).

Then, a point y having the minimum cluster energy $J_2$ ($X_i$, y, $f_r$, i) is selected out of the points satisfying the following conditions.

points y∈D\$X_i$ to which serial numbers are not allocated yet any of four points T(y) in contact with the points y in four directions (up, down, left and right) belongs to a cluster (number j)

the discrepancy between the number of points constituting the cluster (number j) and the minimum number of points constituting a cluster at the present time is less than or equal to $s_a$ The cluster energy $J_2$ ($X_i$, x, $f_r$, i) at the target point x is defined by Expression 7.

Expression 7

$$J_2(X_i, x, f_r, i) = (1-p(i)) \sum_{y \in X_i \setminus C_i(x)} f_r(\|x-y\|) - p(i) \sum_{y \in D \setminus X_i} f_r(\|x-y\|) \quad (7)$$

The meaning of Expression 7 will be described with reference to FIG. 10. First, a weight p(i) means the value of a gray level and is defined as p(i)=i/wh, which implies that p(i) is a real number between 0 and 1. When the target point is defined as x (x indicated by 1010 in FIG. 10), $C_i$ is defined as follows.

$$C_i(x)=\{y \in X_i : \text{cnum}(x)=\text{cnum}(y)\}$$

That is, $C_i(x)$ represents all the points constituting a cluster to which the target point x belongs (all the points indicated by a hatched line in 1020 in FIG. 10) out of all the points to which the serial numbers 0, . . . , i−1 are given. Accordingly, $X_i \setminus C_i(x)$ represents the points from all the points not belong to the clusters with which the target point x is in contact (all the black points of FIG. 10) and one of the serial numbers 0, . . . , i−1 are given and. $D \setminus X_i$ represents all the points (all the points in the blank area in FIG. 10) to which a serial number is not given yet. When points x and y are apart from each other by the distance r or more, y may be restricted to the range of $\|x-y\| \leq r$ due to $f_r$=0. Accordingly, each of the two summation terms in Expression 7 has the following meaning.

the total sum of interaction values between the target point x and all the points y in the clusters not including the point x (the points to which the serial numbers are given already and which do not belong to the cluster including the target point x)":

Expression 8

$$\sum_{y \in X_i \setminus C_i(x)} f_r(\|x-y\|) \quad (8)$$

the total sum of interaction values between the target point x and all the points y in the blank area (the points to which a serial number is not given yet)":

Expression 9

$$\sum_{y \in D \setminus X_i} f_r(\|x-y\|) \quad (9)$$

Due to the weight p(i), the energy between clusters of Expression 8 is evaluated relatively weighted when the serial number i is small (corresponding to a highlight part), and the energy between the blank area of Expression 9 is evaluated relatively weighted when the serial number i is large (corresponding to a shadow part). The rear term (energy of the blank area) of Expression 7 has a minus sign, which is because the magnitude relation is reversed at the time of evaluating the blank in calculating the point energy (Non-patent Document 3).

A point set satisfying a binary pattern patt(x)=BLACK is defined as $X_i$ for the purpose of convenient explanation, but it is not necessary to define/calculate $X_i$ in practice and it has only to be determined whether the target point belongs to $X_i$ with reference to the patt value of the target point. The weight p is set to p(i)=i/wh, but may be fixed to p(i)=0 or other values. When p(i)=0 is set, the interaction values between the blank area expressed by Expression 9 is ignored and only the interaction values between the clusters are considered.

4.1.4 Step 3: Process of Creating Threshold Values 0, . . . , l−1

Through the above-mentioned processes, the serial numbers 0, . . . , wh−1 are uniformly given to the points in X. Finally, if necessary, by allocating the serial numbers to 0, . . . , l−1, the threshold values th(x)∈{0, . . . , l−1} for the points x in the threshold matrix is determined. For example, by dividing the serial numbers by wh/l, the threshold values are determined for each of i=0, . . . , wh−1, as Expression 10.

Expression 10

$$th(v(i))=\text{INT}(i \cdot l/(wh)) \quad (10)$$

In general, when embedding TRC or the like to mask data is required, a control with a mapping process using a table is finally performed without using such linear (uniform) allocation. The process of embedding the TRC or the like to the mask data is performed depending on the characteristics of the output device and thus detailed description thereof will not be made. In the above description, the coordinates of the point to which the serial number i is given are stored in v(i) but a configuration not having v and setting th(x)=i may be employed. Here, since the threshold data is generally stored as an 8-bit value in many cases, a memory of a large bit value needs to be used to store the serial number. In addition, since it is convenient to reversely track the point to which the serial number i is given, the serial number is stored in v(i) in this technique.

4.1.5 Specific Examples and Properties

Figure 11:
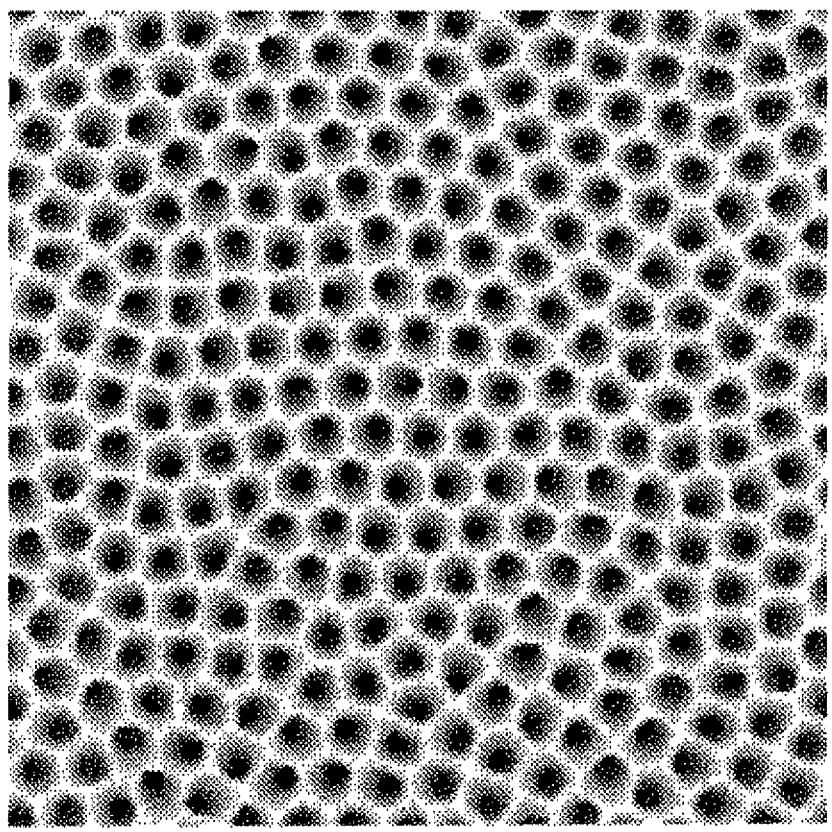
FIG. 11 is a diagram illustrating an example of a random clustered-dot halftone mask created according to this exemplary embodiment.

An example of the mask data (threshold matrix) created through the above-mentioned steps with w=h=160, K=278, and l=256 is shown as an image in FIG. 11. Here, the uniform allocation into 256-tones using Expression 10 is applied in Step 3. As described in the head of this section, in this technique, core points are made to directly grow without designating the shape of a cluster such as a Voronoi polygon which is generally designated in the stochastic clustered-dot halftone mask. Accordingly, it is possible to markedly enhance the degree of freedom in growth of a cluster compared with the related art, such as the method of defining the growth shape of a cluster through the Voronoi polygonal tessellation or the method of evaluating frequency characteristics through the frequency conversion. In addition, since the mathematically-proper function $f_r$ is used, it is possible to make a cluster to grow in the optimal state from the viewpoint of dispersibility. As a result, it is possible to suppress the actualization of a textured pattern or a periodic pattern of the mask. Owing to these merits, it is possible to create a mask with quality which is actually usable with a smaller mask size.

Figure 12:
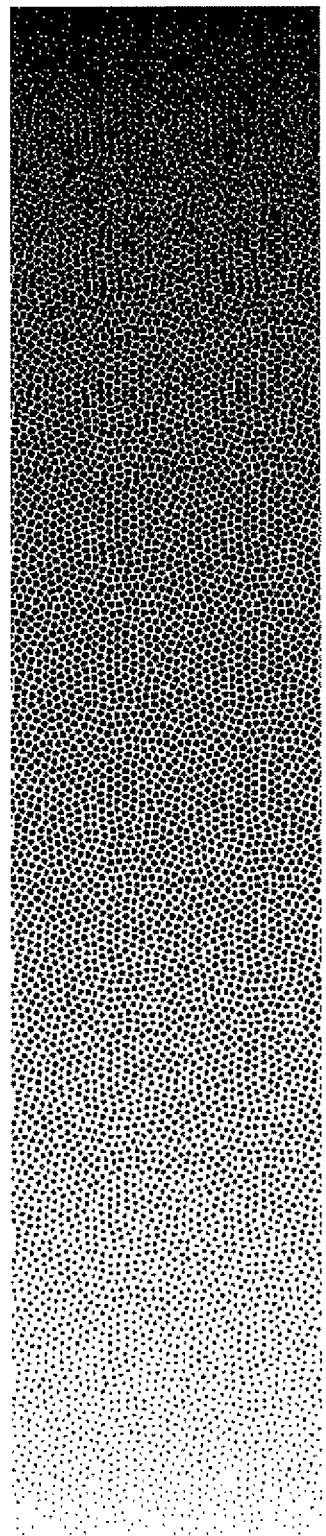
FIG. 12 is a diagram illustrating an example where a binarization process is performed using the random clustered-dot halftone mask created according to this exemplary embodiment.

FIG. 12 shows an example of a binary image half toned by using this mask (corresponding to 250 lines at the time of output with 2400 dpi). FIGS. 13A and 13B show examples of a natural image half toned by using another mask created by the method according to this technique (corresponding to 300 lpi and 400 lpi at the printout with 2400 dpi, respectively).

4.1.6 Speed-up

In Step 2, a point having the minimum energy is selected out of all the non-processed points (points to which a serial number is not given) in the mask so as to select a point to which a new serial number i should be given. When this energy calculation is speeded up, the process time may be greatly shortened. In a method of speeding up the energy calculation, by noting that the energy value $f_r(\|x-y\|)=f_r(r_1)$ between a target point x and a point y apart therefrom by a predetermined distance $r_1$ is always constant and the distance $r_1$ is merely the distance between lattice points on the basis of characteristics of a discrete space, it is possible to skip unnecessary calculation by storing the value of $f_r(r_1)$ in a table and referring thereto if necessary. Specifically, for a given energy influence radius r, a table $t(x)(x \in D_d)$ for lattice points x within the distance r from an origin has only to be defined as follows with $r_{int}:=\text{INT}(r+1)$, $d:=2r_{int}+1$ and $D_d:\{0, \ldots, d-1\}$.

$t(x+(r_{int},r_{int})^t)=f_r(\|x\|)$ (where the superscript $t$ represents transposition)

The energy value at a point y, located apart a distance r from the target point x, between the point x may be referred to using the following expression.

$f_r(x-y)=t(x-y+(r_{int},r_{int})^t)$

Since this table t(x) is a two-dimensional table, the speed may be raised by changing the two-dimensional table to a one-dimensional table (in this case, since the multiplication in the address calculation is reduced and a rectangular area does not have to be referred to as in the two-dimensional table by storing only the points within the radius r, the speed is raised).

In addition to this speed-up, the processing speed may be raised by obvious speed-up in programs or a configurational invention in Step 2. However, Example 2 to be described below is more excellent than the other speed-up methods.

4.2 Speed-Up (Example 2)

A random clustered-dot halftone mask is created through the above-mentioned series of algorithms, but this has various variations. Speed-up substantially difference from the speed-up described in the section 4.1.6. will be described below. Plainly speaking, when a serial number i is determined for a point x, it is not efficient to calculate the energy values of all the candidate points again at the time of determining a serial number i+1. In fact, when a serial number i is determined for a point x, since a variation in energy values is limited to only the points within the radius r from the point, and the displacement of the energy value at each point is only due to the interaction value with the point x, it is possible to greatly reduce the calculation load by storing the energy value of each point in a memory and updating only the displacement.

4.2.1 Step 2A

In the algorithm of Step 2, $J_{current}=J_2(X_i, y, f_r, i)$ or $J_{current}=J_1(X_i, y, f_r, i)$ is calculated. However, when this calculation is performed merely by referring to the memory, it is not necessary to calculate the energy of all the points of which the serial number is not determined in a mask and it is thus possible to greatly raise the processing speed. The flow of this speed-up passes along "Step 1→Step 2A→Step 3". Step 1 and Step 3 are the same as described in Example 1, but the following memories are additionally prepared and initialized in Step 1.

$e_{apart}(x)$ (energy value between x and a cluster to which x does not belong): which is used to update the value of Expression 8 at each point $x \in D$ initialized into $e_{apart}(x)=0$ $e_{touch}(x)$ (energy value between x and a cluster to which x belongs): which is used to update the value of Expression 9 at each point $x \in D$ initialized into $e_{touch}(x)=0$ Here, $e_{total}=\Sigma_{y \in D}f_r(\|y\|)$(constant) is also determined. As may be seen from Expression 7 and FIG. 10, since it is necessary to calculate the energy values between a target point and a counter non-contact cluster (black in FIG. 10) and between the target point and a counter blank (white in FIG. 10) at the time of calculating the energy of each point, the memories are prepared to store these energy values. Here, it may be seen that the energy of the counter blank cluster may be acquired by storing the energy of a counter contact cluster (hatched line in FIG. 10) using the relational expression of $\Sigma_{y \in D}f_r(\|x-y\|)=\Sigma_{y \in D}f_r(\|y\|)$ and Expression 11 that both hold for each $x \in D$.

Expression 11

$$\sum_{y \in D \setminus X_i} f_r(\|x-y\|) = \sum_{y \in D} f_r(\|y\|) - \sum_{y \in X_i \setminus C_i(x)} f_r(\|x-y\|) - \sum_{y \in C_i(x)} f_r(\|x-y\|) \quad (11)$$

$$= e_{total} - e_{apart}(x) - e_{touch}(x)$$

Therefore, the point energy $J_1$ may be expressed by Expression 12 and the cluster energy $J_2$ may be expressed by Expression 13 using $e_{empty}=e_{total}-e_{apart}(x)-e_{touch}(x)$ on the basis of Expression 7 and Expression 11.

Expression 12

$$J_1(X_i,x,f_r)=e_{apart}(x)+e_{touch}(x) \quad (12)$$

Expression 13

$$J_2(X_i,x,f_r,i)=(1-p(i))e_{apart}(x)-p(i)e_{empty} \quad (13)$$

Accordingly, when $e_{apart}(x)$ and $e_{touch}(x)$ of all the points are updated at the time of creating the serial number i−1, it is possible to acquire the energy value by referring to the memories using Expression 13 at the time of searching for the point having the minimum energy to which the serial number i is allocated.

Step 2A will be described below with reference to the flowchart shown in FIG. 14. Step 2A is a step used to speed up Step 2 in Example 1 and Step 1 and Step 3 are the same as described in Example 1. Step 2A is different from the algorithm of Step 2 in Example 1, in that the energy calculation and the determination of a cluster number are performed by referring to memories and an updating process is additionally performed after a point having the minimum energy is selected. Accordingly, in the flowchart shown in FIG. 14, parts different from the flowchart (FIG. 7) of Step 2 are indicated by bold frames (S1404, S1408, and S1410).

In Step 2A, a point x having the minimum energy is acquired by referring to the memories for a serial number i in S1404 and the updating process of S1406 or the steps subsequent thereto is performed. As the point having the minimum energy, a point having the minimum cluster energy is selected out of candidate points (points y satisfying cnum(y)≠−1). The candidate points are all points in contact with the clusters arranged already like Step 2. In Step 2A, the candidate points are already updated and registered through the updating process to be described later in the step of creating a serial number i−1. In Step 2 of Example 1, the process of selecting the point having the minimum cluster energy is performed along Flowchart 1a shown in FIG. 8 and Flowchart 1b shown in FIG. 9. In Example 2, the process of selecting the point having the minimum cluster energy is performed along Flowchart 2a shown in FIG. 15 and Flowchart 2b shown in FIG. 16 by referring to the memories. This will be described later.

In S1404, the point x to which the serial number i should be given is determined. Then, after the same updating process as in S706 of Step 2 is ended in S1406, in S1408 and S1410, two updating processes are performed as a pre-process of processing the next serial number i+1. These will be also described later.

The method of selecting a point x having the minimum cluster energy (otherwise, a point $\bar{x}$ having the minimum point energy) out of the points to which a serial number is not given yet in D will be described below with reference to Flowchart 2a shown in FIG. 15 and Flowchart 2b shown in FIG. 16. Here, the energy value is not sequentially calculated but is determined by referring to the memories. In the flowcharts shown in FIGS. 15 and 16, parts different from the flowcharts shown in FIGS. 8 and 9 of Step 2 in which the sequential calculation is used are indicated by bold frames (S1506, S1510, S1606, and S1610). Only the different parts will be described below.

Since the point energy $J_1$ and the cluster energy $J_2$ at a point y need not be sequentially calculated as in Step 2 and may be determined by referring to the values of $e_{apart}(y)$ and $e_{touch}(y)$ as described in Expression 12 and Expression 13, $J_{current}$ may be obtained by the substitutions with these energy values, as described in S1510 or S1610.

In Step 2 (S906), when the point y is selected and there is a point z∈T(y) to which a cluster number cnum is given, j=cnum(z) is set, where the set T(y) are defined as four points in contact with the point y∈D in four directions. When the point y is not in contact with any cluster, j=−1 is set. However, in Step 2A, all the cluster number cnum(y) of the points y∈D of which the serial number is not determined is updated in the step after the serial number i−1 is determined through the use of the updating process to be described later (including the case of cnum=−1). Accordingly, in S1504 or S1604, j=cnum(y) has only to be merely set.

Figure 17:
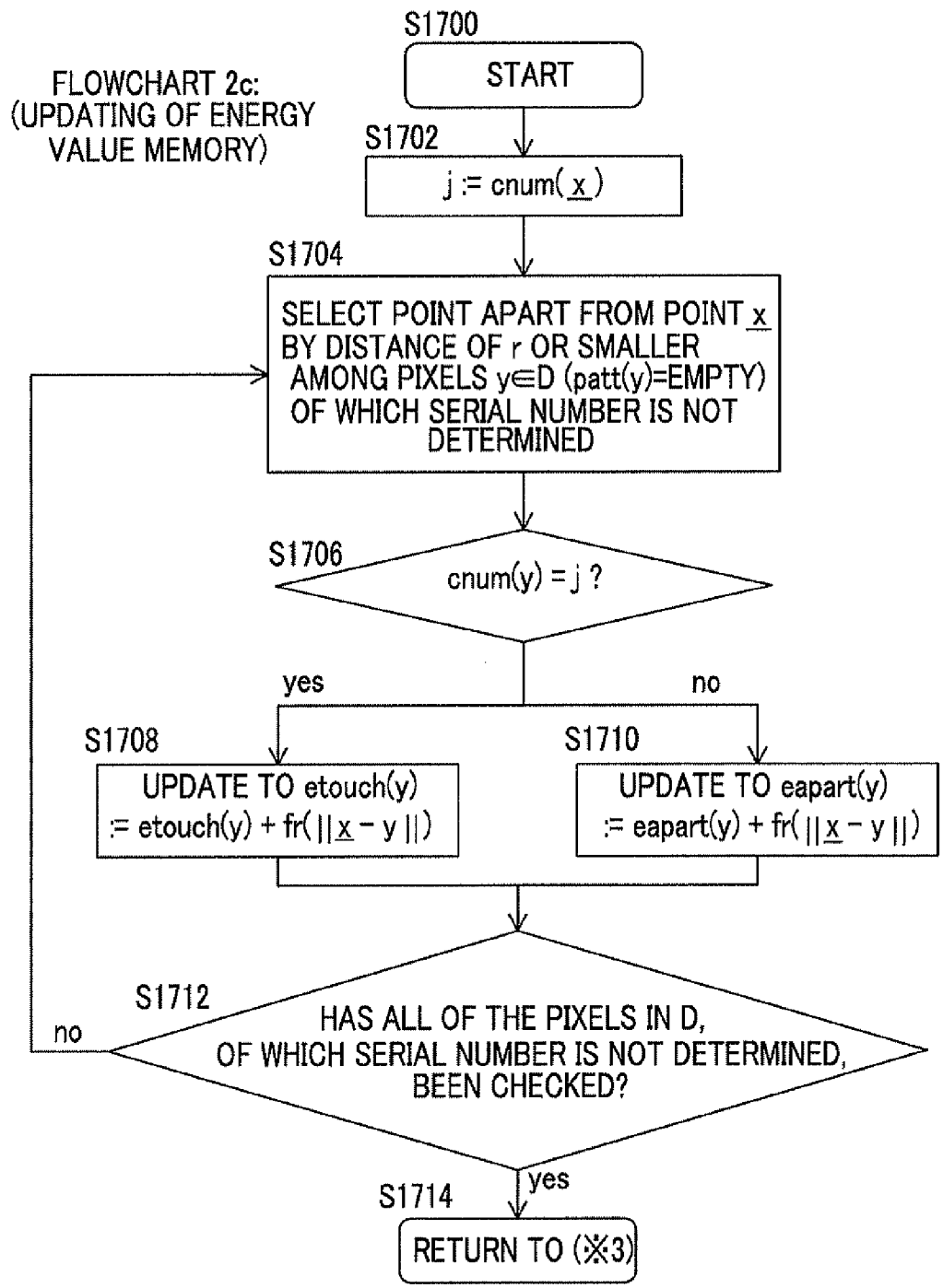
FIG. 17 is a flowchart illustrating an example of a process of updating an energy-value storage memory, which is used in the flowchart of FIG. 14.

In the flowchart of Step 2A shown in FIG. 14, the updating process in S1408 will be described below with reference to Flowchart 2c shown in FIG. 17.

By newly setting a point x=v(i) corresponding to the serial number i, only the value of a term, acting on the point x, in the energy values of the other non-processed points y∈D\(Xi∪{x}) is changed (in other words, the relation between the other points and the point y is not changed). Accordingly, in Flowchart 2c shown in FIG. 17, this change is calculated to update the energy value storage memory.

A point to which the serial number i is given is defined as x and j:=cnum(x) is set in S1702. In S1704, a point y∈D to which a serial number is not given is taken. When the point is apart by the distance r or more, $f_r$=0. Accordingly, in this case, y may be limited to the range of ∥x−y∥≤r. When it is determined in S1706 that the point y is in contact with the cluster to which the point x belongs already, that is, when cnum(y)=cnum(x)=j, the point x is considered to belong to the same cluster that y belongs to in S1708 and the $f_r$ value between the point y and the point x is added to the value of $e_{touch}$. Otherwise, the point x belongs to a cluster different from the point y and thus the same $f_r$ value is added to the value of $e_{apart}$ in S1710.

Accordingly, the change in energy value at the non-processed point (a point to which a serial number is not given yet) y due to the giving of the serial number i to the point x is calculated and updated. The process of determining a non-processed point is duly performed in S1712.

Figure 18:
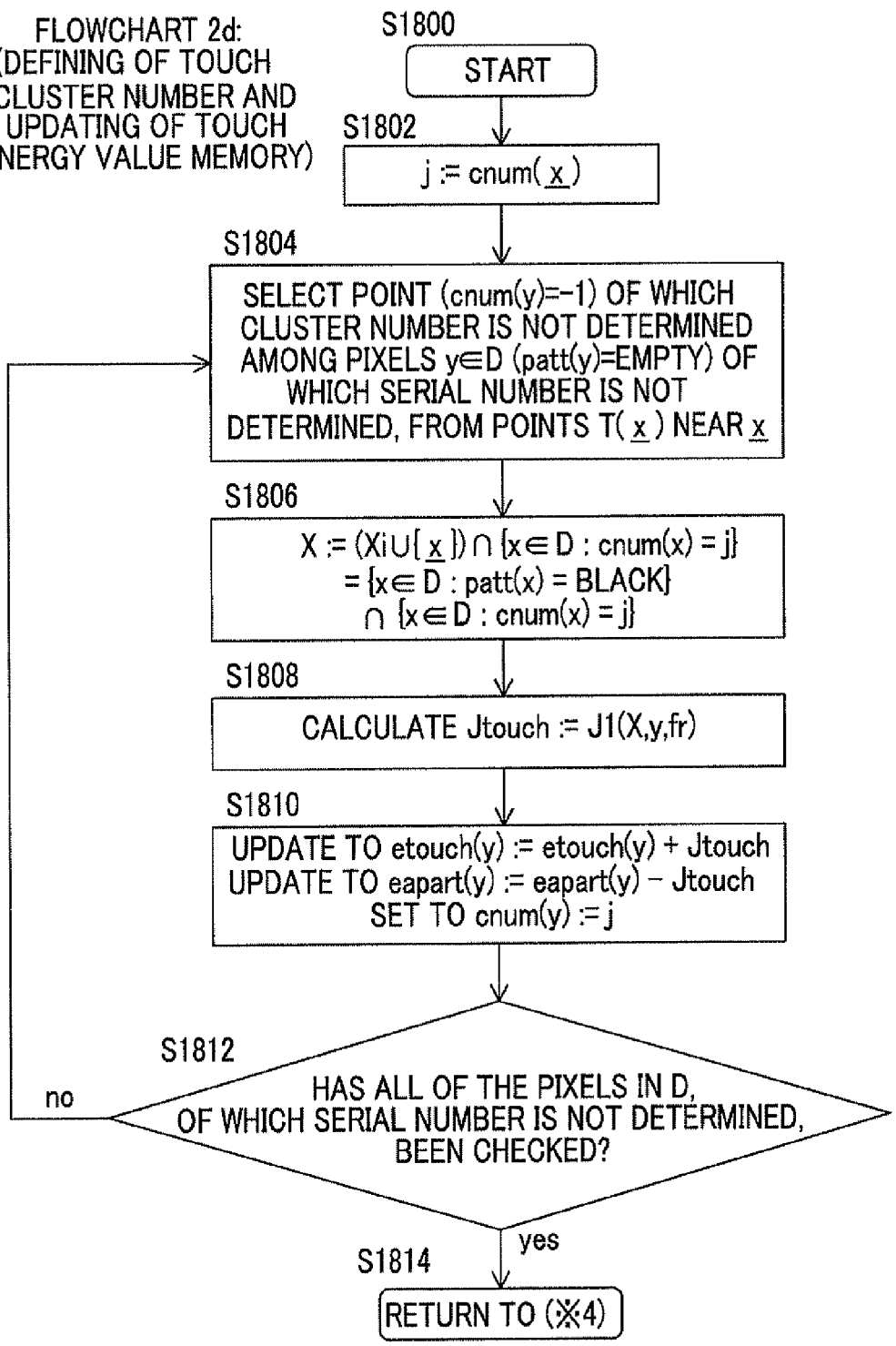
FIG. 18 is a flowchart illustrating the definition of a touch cluster number and an example of a touch energy value updating process, which are used in the flowchart of FIG. 14.

In the flowchart of Step 2A shown in FIG. 14, the updating process of S1410 will be described below with reference to Flowchart 2d shown in FIG. 18. The energy value is updated in Flowchart 2c shown in FIG. 17, but by adding the point x to a predetermined cluster, a non-processed point out of four points (that is, the points T(x)) in four directions of the point x is newly in contact with the same cluster as the point x. Accordingly, along Flowchart 2d shown in FIG. 18, the definition of contact with the new cluster based on four points around the point x and the change in energy value are performed.

For the point x to which the serial number i is given, j=cnum(x) is set in S1802. In S1804, a point y (to which a serial number is not given) to which a cluster number is not given yet is selected out of the four points around the point x. The point y is not in contact with any cluster hitherto, but it is now ensured that the point y is in contact with the same cluster as the point x belongs to by newly adding adjacent points x to the cluster. Since the point y is not in contact with any cluster hitherto, the energy $J_{touch}$ between the cluster and the point y was added to $e_{apart}$. However, since it is now ensured that the point y is in contact with the cluster to which x belongs, the energy $J_{touch}$ is added to $e_{tough}$ and the energy $J_{touch}$ is subtracted from $e_{apart}$ in S1810. More specifically, by noting that the value of $J_{touch}$ is the energy between the point y and the points which belong to the same cluster as the point x and to which a threshold value is given already, x={x∈D: patt(x)=BLACK}∩{x∈D: cnum(x)=j} is defined in S1806, and $J_{touch}=J_1(X, y, f_r)$ is defined in S1808. In S1810, the cluster number of the point y is set to the same number j as the point x. The process of determining a non-processed point is duly performed in S1812.

All the updating processes associated with the giving of a serial number i is ended.

Referring to the main flow of Step 2A again, i is updated as i:=i+1 in S1412. Inductively, all the serial numbers i=0, . . . , wh−1 are given and Step 2A is ended. This corresponds to the determination process of S1414, which is the same as described above. In Step 2, the energy is calculated for all the non-processed points for each serial number i. However, in Step 2A, the calculation of an energy value or the acquisition of a cluster number is performed by referring to the memories and the necessary calculation is suppressed. Accordingly, as the energy influence radius r or the mask size w×h increases, the speed-up effect is more raised. In Step 2, the process of determining contact of all the non-processed points with a cluster is performed in the order of such as up→right→down→left. However, in Step 2A, it is determined that the non-processed points around the point to which the serial number is given just before belong to the same cluster. Accordingly, when a non-processed point is in contact with plural clusters (in the deep shadow part), the determination of a contacting cluster may differ between both steps. As a result, Step 2 and Step 2A are different from each other in the pattern of the deep shadow part of the mask pattern, but are statistically equal to each other in image quality.

4.3. Optimal Arrangement of Core Points (Example 3)

In Step 2 or Step 2A, initial points (core points) constituting K clusters, that is, the initial numbers i=0, . . . , K−1 in the process of creating the serial numbers i=0 to i=wh−1, are sequentially selected in ascending order of point energy while excluding the limitation of "to be contacted to clusters arranged already". Another method may be used to give the serial numbers to the K initial points. For example, firstly K points may be arranged randomly, then the K points may be made to converge on the optimal arrangement by energy drop, and the serial numbers may be given to the points in ascending order of energy. Such a method will be described below. The method of arranging K points and making the K points to converge to the optimal arrangement by energy drop is described, for example, in Non-patent Document 3. The process of creating the serial numbers i=0 to i=K−1 may be performed substantially in the same way as in Example 1. Therefore, such a flowchart will not be described. In the following description, signs or terms are the same as in Examples 1 and 2.

4.3.1. Arrangement of K Core Points and Convergence

First, initialization is performed in the same way as described in the section 4.1.1. (Step 1: Preparation) of Example 1. Then, K points randomly selected from D is set to a point set X and patt (x)=BLACK is set for each point x∈X. Then, each point x is locally moved, without overlapping with another point of X, to a place where the point energy $I(X, x, f_r)$ of each point expressed by Expression 1 is the lowest. For x, the point moved from x, the updating is performed as patt ($\bar{x}$)=WHITE and patt(x)=BLACK. This process is repeatedly performed on all the points x∈X until a point of which the energy may be lowered does not exist. The K points converging on the lowest-energy state correspond to the core points. In this process, a method of preparing a threshold value t≥0 may be employed, where every movement of a point is permitted when the energy increase is less than t and a reduction of the value t with every movement is executed. By employing this method, it may be possible to make the respective points to converge to a more lower-energy state, compared with a hill-climbing method of simply moving the respective point to the point having the lowest energy. When t=0 is fixed from the first time, the method corresponds to the hill-climbing method. For example, FIGS. 19A and 19B show initial random arrangement (see FIG. 19A (before the energy drop)) when w=h=160 and K=278 and convergence results of the above-mentioned process (see FIG. 19B (after the energy drop)) (points x with patt(x)=BLACK are shown). In FIGS. 19A and 19B, a state where the energy is minimized on a certain degree (not completely minimized) is shown.

4.3.2. Process of Allocating Serial Numbers 0, . . . , K−1 to Core Points

The serial numbers 0, . . . , K−1 are given to the K core points sequentially from the point having the lowest energy. That is, a process of selecting a core point having the minimum point energy out of the core points not turned on yet and giving a serial number i to the selected core point when all the points having the serial numbers j=0, . . . , i−1 given thereto already are turned on is performed. This process will be specifically described below. The set X of the points is first set to X={x∈D: patt(x)=BLACK} and the points x∈X are once reset to patt(x)=EMPTY. In addition, i=0 and $X_i$={x∈X:patt (x)=BLACK} are set, the point y having the minimum $J_{current}$=$J_1(X_i, y, f_r, i)$ is taken out of the points y∈X\$X_i$, and then x=y is set. In the same way as in S706 of Flowchart 1, the updating is performed as patt($\underline{x}$)=BLACK $v(i)=\underline{x}$ cnum($\underline{x}$)=i $s(j)=s(j)+1$ $s_{min}=\min\{s(i):i=0,\ldots,K-1\}$.

The meaning thereof is described above in the section 4.1.2. (Step 2) of Example 1. When the updating is ended, the value of i is updated as i:=i+1 and the processes subsequent to the definition of $X_i$ are repeatedly performed to perform the updating process up to i=K−1.

In this way, the K core points are defined and the serial numbers and the cluster numbers are given thereto. That is, the respective points v(i) corresponding to the serial numbers i=0, . . . , K−1 are uniquely defined and patt (v(i))=BLACK and cnum(v(i))=i are set. At this time, for the other wh−K points x, patt(x)=EMPTY and cnum(x)=−1 remains unchanged. The allocation of the other serial numbers may be performed along Step 2 or Step 2A. The processing speed of allocating the serial numbers i=0, . . . , K−1 described in this section may be raised in the same way as described in Step 2A.

When the serial numbers 0, . . . , wh−1 are obtained in Step 2 and are divided by wh/l, for example, using Expression 10 in Step 2 and the threshold values 0, . . . , l−1 are allocated to the points in the threshold matrix, the serial numbers 0, . . . , K−1 determined in this step finally correspond to the threshold values 0, . . . , (K−1)·l/(wh). When w=h=160, K=278, and l=256 are assumed, the threshold values correspond to 0, . . . , 2.77, which correspond to the first to third tones in the highlight part out of 256 tones. This range of tones corresponds to a step before forming a cluster and a step of sequentially turning on the core points. In general, satisfactory image quality may be achieved using the method according to Example 1 (2), but the method according to Example 3 may be used when the image quality of the highlight part has priority.

4.4 Control of Growing Order of Cluster (Example 4)

In Examples 1 to 3, the clusters grow from the highlight part (serial number 0) to the shadow part (serial number wh−1) (the serial numbers are allocated), but, for example, an intermediate density (serial number p) may be firstly prepared and then the clusters may be made to grow in the order of i=0, 1, . . . , p−1, wh−1, wh−2, . . . , and p or in the order of i=0, wh−1, 1, wh−2, 2, wh−3, . . . , p−1, and p.

For example, when this method is embodied in Step 2A, each of four memories of $e_{touch}$, $e_{apart}$, cnum, and $s_{min}$ may be divided for black dots and white dots: for example, $e_{touchb}$, $e_{apartb}$, cnumb, and $s_{minb}$ for black dots and $e_{touchw}$, $e_{apartw}$, cnumw, and $s_{minw}$ for white dots, and these memories may be switched by the use of a pointer depending on whether the pixel of interest patt(x) is BLACK or WHITE. (The reason of defining "WHITE" for the binary pattern memory patt(x) in Step 1 is for controlling the cluster growing order for WHITE pixels in this example.) Except the order of the serial numbers or the pointer switching depending on the color of the pixel of interest, the flow of processes in Step 2A may be used without any further change. Accordingly, the point having the minimum energy may be selected and the serial number may be given to the selected point, depending on BLACK and WHITE.

Figure 20:
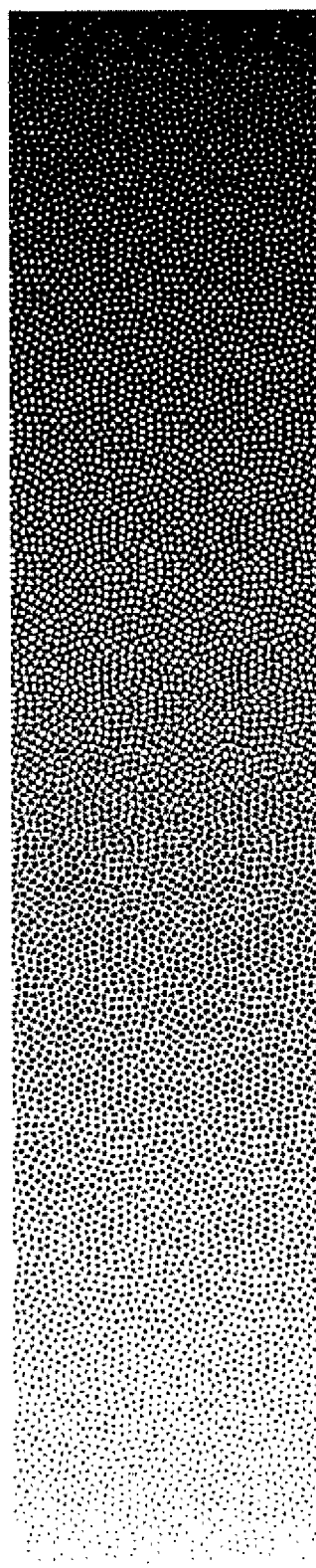
FIG. 20 is a diagram illustrating another example where the binarization process is performed using a random clustered-dot halftone mask created according to this exemplary embodiment.

FIG. 20 shows an example of a binary image half toned by using a mask created with w=h=160, K=278, l=256, and p=wh/2, that is, by designing black clusters and white clusters in the order of i=0, wh−1, 1, wh−2, 2, wh−3, . . . , p−1, and p, from both of the highlight part (0%) and the shadow part (100%) toward 50% with the density of 50% as a boundary.

5. Frequency Characteristics

As described in Section 2.3, the random clustered-dot halftone mask may be conceptually classified into a stochastic clustered-dot halftone mask (see Non-patent Documents 5 and 6) and a green-noise mask (see U.S. Pat. No. 6,493,112 and Non-patent Document 4). In this section, it is confirmed that the present technique is a technique belonging to the former type.

Figure 21A:
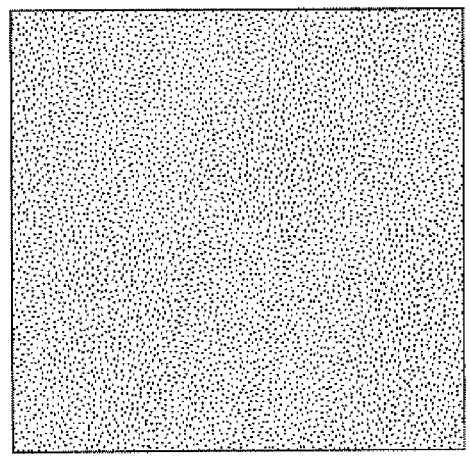
FIGS. 21A to 21D are diagrams illustrating comparative examples where binary images generated using a random dispersed-dot mask and a random clustered-dot halftone mask created according to this exemplary embodiment are compared with each other in frequency characteristics.
Figure 21C:
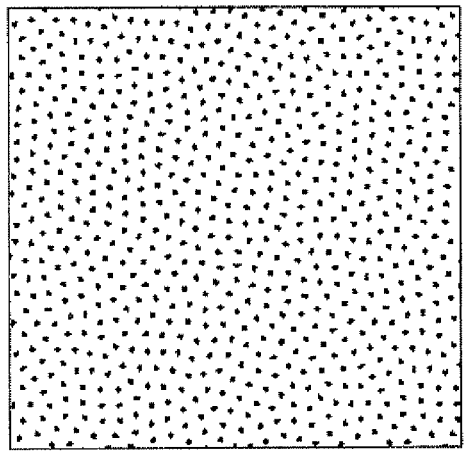
Figure 21B:
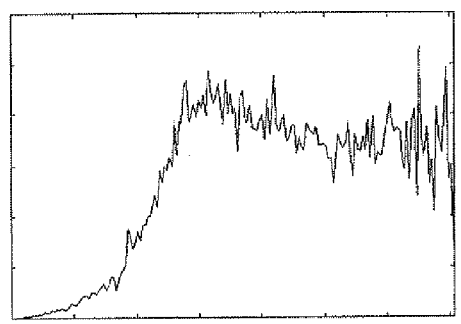
Figure 21D:
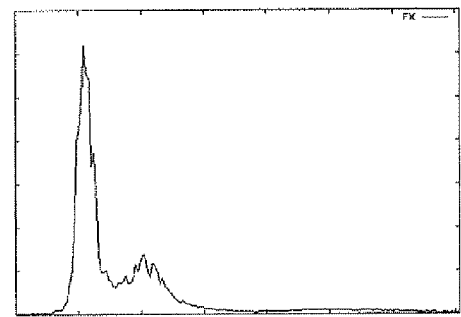
Figure 22A:
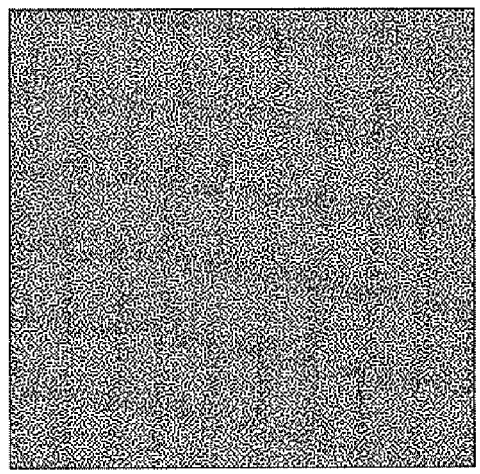
FIGS. 22A to 22D are diagrams illustrating comparative examples where binary images generated using a random dispersed-dot masks and a random clustered-dot halftone mask created according to this exemplary embodiment are compared with each other in frequency characteristics.
Figure 22C:
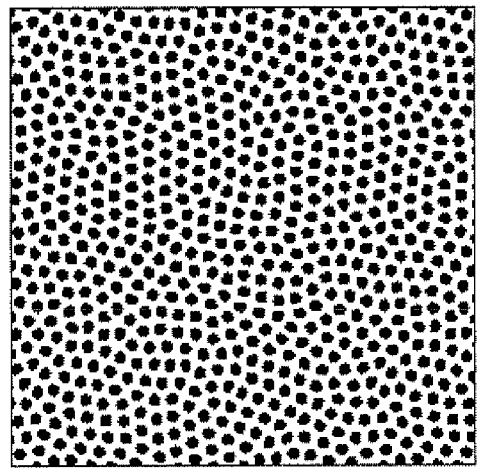
Figure 22B:
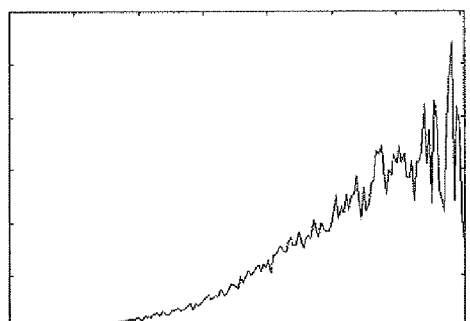
Figure 22D:
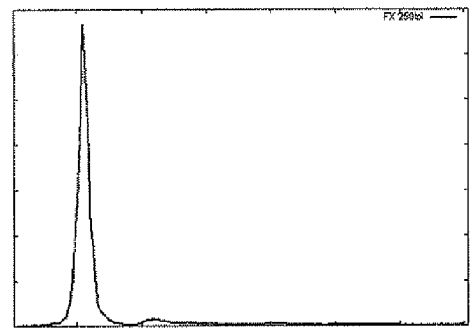

FIGS. 21A to 21D show binary patterns with the tone level 24 half toned by the dispersed-dot halftone mask and the mask created according to this technique and the results with the RAPSD. FIG. 21A shows an example of a halftone pattern of the tone level 24 with the dispersed-dot mask (Non-patent Document (the mask created through the method described in "2.1. Creation of Random Dispersed-dot Halftone Mask")) and FIG. 21B shows the RAPSD of the pattern. On the other hand, FIG. 21C shows an example of a halftone pattern of the tone level 24 with the mask created according to this technique and FIG. 21D shows the RAPSD of the pattern. Similarly, FIGS. 22A and 22C show examples of the halftone pattern of the tone level 80 with the same mask used in FIGS. 21A and 21C, respectively, and FIGS. 22B and 22D show the RAPSD of the patterns.

When the dispersed-dot halftone mask is used, it may be seen that the peak frequency of the RAPSD shifts to a high frequency side with the variation in density. This property is similarly seen when a green-noise mask is used because of the definition thereof. On the other hand, when the random clustered-dot halftone mask according to this technique is used, it may be seen that the peak frequency of the RAPSD is fixed regardless of the variation in density, similarly to the stochastic clustered-dot halftone mask.

6. Hardware Configuration

Figure 23:
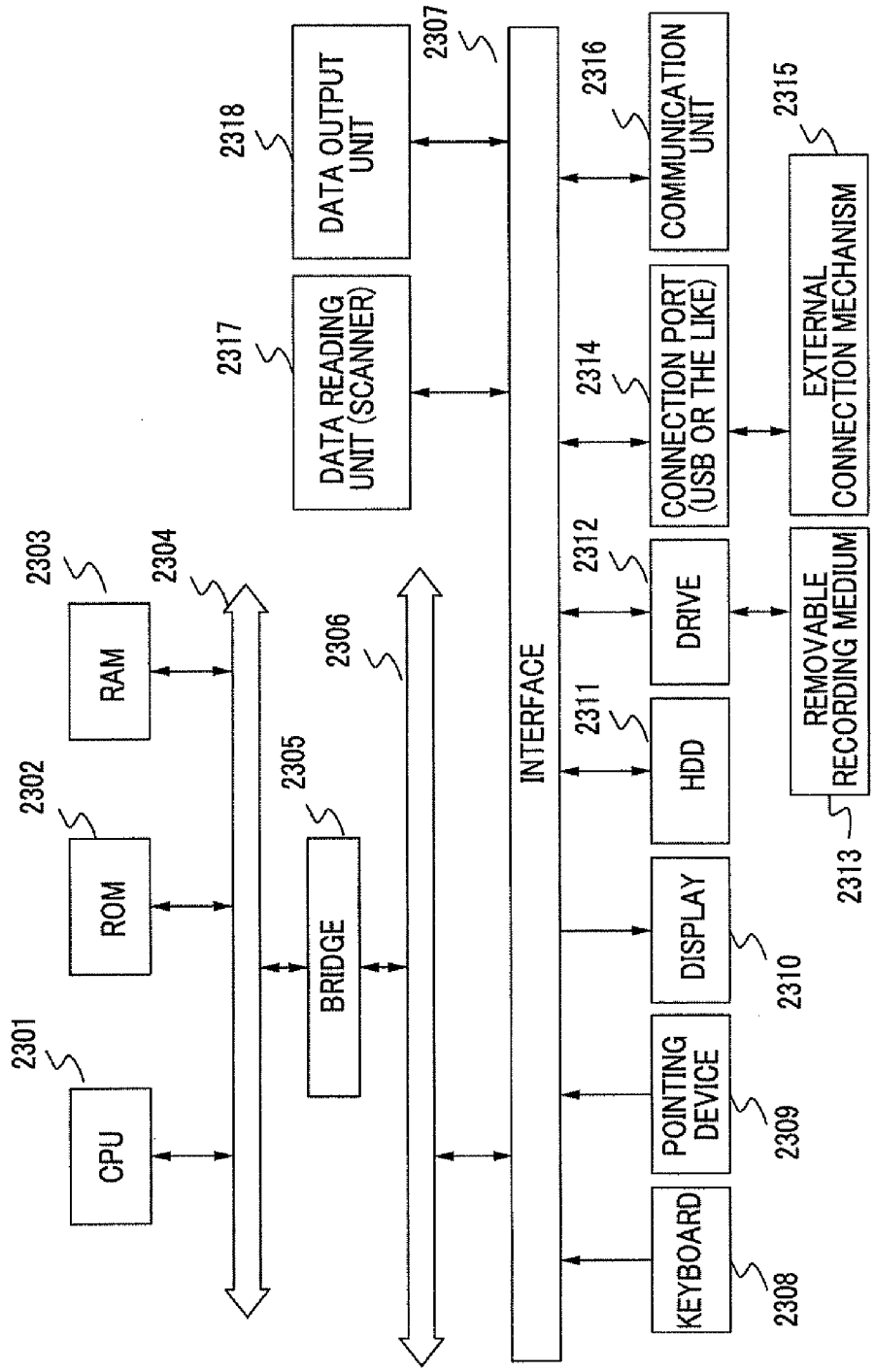
FIG. 23 is a block diagram illustrating an example of a hardware configuration of a computer that implements this exemplary embodiment.

An example of the hardware configuration of the mask creating device 100 and the image forming apparatus 200 according to this exemplary embodiment will be described with reference to FIG. 23. The configuration shown in FIG. 23 is constructed, for example, by a personal computer (PC) or the like and includes a data reading unit 2317 such as a scanner and a data output unit 2318 such as a printer.

A CPU (Central Processing Unit) 2301 is a control unit that performs processes in accordance with a computer program in which execution sequences of various modules described in the above-mentioned exemplary embodiments, that is, various modules such as the energy calculating module 110, the ranking module 120, the threshold allocating module 130, the output module 140, the image receiving module 210, the mask processing module 220, and the output module 230, are described.

A ROM (Read Only Memory) 2302 stores programs or calculation parameters used by the CPU 2301. A RAM (Random Access Memory) 2303 stores programs used for the operation of the CPU 2301 or parameters appropriately varying in the operation. These memories are connected to each other via a host bus 2304 including a CPU bus.

The host bus 2304 is connected to an external bus 2306 such as a PCI (Peripheral Component Interconnect/Interface) bus via a bridge 2305.

A keyboard 2308 and a point device 2309 such as a mouse are input devices operated by an operator. A display 2310 employs a liquid crystal display device or a CRT (Cathode Ray Tube) and displays a variety of information as text or image information.

An HDD (Hard Disk Drive) 2311 has a hard disk built therein and drives the hard disk to record or reproduce the programs executed by the CPU 2301 or information. The hard disk stores mask data, image data, and the like. The hard disk also stores various computer programs such as various other data processing programs.

A drive 2312 reads data or programs recorded on a removable recording medium 2313 such as a magnetic disk, an optical disc, a magneto-optical disc, and a semiconductor memory, and supplies the read data or program to the RAM 2303 connected thereto via the interface 2307, the external bus 2306, the bridge 2305, and the host bus 2304. The removable recording medium 2313 may be also used as a data recording area like the hard disk.

A connection port 2314 is a port for connection to an external connection device 2315 and includes a connector of USE, IEEE 1394, or the like. The connection port 2314 is connected to the CPU 2301 via the interface 2307, the external bus 2306, the bridge 2305, and the host bus 2304. A communication unit 2316 is connected to a communication line and performs a data communication process with an external device. A data reading unit 2317 is, for example, a scanner and performs a document reading process. A data output unit 2318 is, for example, a printer and performs a document data output process.

The hardware configuration shown in FIG. 23 merely shows a configurational example, and the exemplary embodiments are not limited to the configuration shown in FIG. 23, as long as it may implement the modules in the exemplary embodiments. For example, some modules may be constructed by dedicated hardware (such as an application specific integrated circuit (ASIC)), some modules may be arranged in an external system and may be connected thereto via a communication line, or the plural systems shown in FIG. 23 may be connected to each other via communication lines and may operate in cooperation with each other. The hardware system may be mounted on a copier, a facsimile, a scanner, a printer, a multi-function apparatus (image processing device having two or more of a scanner function, a printer function, a copier function, and a facsimile function), or the like.

Although this exemplary embodiment has been described using the mathematical expressions, the expressions include equivalents thereof. The equivalents include modifications of the expressions of such an extent not to affect the final result or algorithmic solutions to the expressions, in addition to the mathematical expressions.

The above-mentioned program may be provided in a state where it is stored on a recoding medium, or the program may be provided via a communication unit. In this case, for example, the program may be understood as an invention of a "computer-readable recording medium having a program recorded thereon".

The "computer-readable recording medium having a program recorded thereon" means a computer-readable recording medium having a program recorded thereon, which is used to install, execute, and distribute the program.

Examples of the recording medium include digital versatile discs such as "a DVD-R, a DVD-RW, and a DVD-RAM" with a standard defined in the DVD forum and "a DVD+R and a DVD+RW" with a standard defined in the DVD+RW, compact discs (CD) such as a CD-ROM, a CD-R, and a CD-RW, a Blu-ray Disc (registered trademark), an optical-magnetic disc (MO), a flexible disk (FD), a magnetic tape, a hard disk, a read only memory (ROM), an electrical erasable and programmable read only memory (EEPROM (registered trademark)), a flash memory, a random access memory (RAM), and an secure digital (SD) memory card.

The program or a part thereof may be recorded on the recording medium and then may be conserved or distributed. By communications, for example, via a transmission medium such as a wired network or a wireless communication network used for a local area network (LAN), a metropolitan area network (MAN), a wide area network (WAN), the Internet, an intranet, an extranet, and the like or combinations thereof, the program may be transmitted, or may be carried through the use of carrier waves.

The program may be a part of another program or may be recorded on a recording medium along another program. The program may be divided and recorded on plural recording mediums. The program may be recorded in any form, as long as it may be restored from a compressed and encoded state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing mask creating method comprising:
    calculating cluster energy of each point in an image processing mask;
    ranking points in ascending order or descending order on the basis of calculated cluster energy values; and
    allocating threshold values to the points in the image processing mask on the basis of the ranks as the process result of the ranking,
    wherein the cluster energy is defined as the sum of interaction values $f_r(\|x-y\|)$ having the distance $\|x-y\|$ between a target point x and a point y belonging to a cluster not including the target point x as a parameter.

2. The image processing mask creating method according to claim 1, wherein the cluster energy is also defined as a weighted average of the sum and the negative sum of interaction values $f_r(\|x-y\|)$ having the distance $\|x-y\|$ between a target point x and a point y belonging to a blank area as a parameter.

3. The image processing mask creating method according to claim 2, wherein the function $f_r$ is determined by a second-order differentiable function having predetermined strength convexity.

4. The image processing mask creating method according to claim 3, in the ranking,
    wherein the cluster energy of a considered point is calculated as the energy between the considered point and the points having lower ranks when a rank i is given in ascending order,
    wherein the cluster energy of a considered point is calculated as the energy between the considered point and the points having higher ranks when a rank i is given in descending order, and
    wherein the considered points are taken from all the points not ranked yet in any case and the rank i is given to the point having the minimum cluster energy among the considered points.

5. The image processing mask creating method according to claim 4, in the calculating,
    wherein core points of K clusters are randomly arranged in the image processing mask and the core points are created by energy drop, and
    wherein serial numbers 0 to K−1 are given to the K core points in ascending order of the cluster energy values.

6. The image processing mask creating method according to claim 3, in the calculating,
    wherein core points of K clusters are randomly arranged in the image processing mask and the core points are created by energy drop, and
    wherein serial numbers 0 to K−1 are given to the K core points in ascending order of the cluster energy values.

7. The image processing mask creating method according to claim 2, in the ranking,
    wherein the cluster energy of a considered point is calculated as the energy between the considered point and the points having lower ranks when a rank i is given in ascending order,
    wherein the cluster energy of a considered point is calculated as the energy between the considered point and the points having higher ranks when a rank i is given in descending order, and
    wherein the considered points are taken from all the points not ranked yet in any case and the rank i is given to the point having the minimum cluster energy among the considered points.

8. The image processing mask creating method according to claim 7, in the calculating,
    wherein core points of K clusters are randomly arranged in the image processing mask and the core points are created by energy drop, and
    wherein serial numbers 0 to K−1 are given to the K core points in ascending order of the cluster energy values.

9. The image processing mask creating method according to claim 2, in the calculating,
    wherein core points of K clusters are randomly arranged in the image processing mask and the core points are created by energy drop, and
    wherein serial numbers 0 to K−1 are given to the K core points in ascending order of the cluster energy values.

10. The image processing mask creating method according to claim 1, wherein the function $f_r$ is determined by a second-order differentiable function having predetermined strength convexity.

11. The image processing mask creating method according to claim 10, in the ranking,
    wherein the cluster energy of a considered point is calculated as the energy between the considered point and the points having lower ranks when a rank i is given in ascending order,
    wherein the cluster energy of a considered point is calculated as the energy between the considered point and the points having higher ranks when a rank i is given in descending order, and
    wherein the considered points are taken from all the points not ranked yet in any case and the rank i is given to the point having the minimum cluster energy among the considered points.

12. The image processing mask creating method according to claim 11, in the calculating,
    wherein core points of K clusters are randomly arranged in the image processing mask and the core points are created by energy drop, and
    wherein serial numbers 0 to K−1 are given to the K core points in ascending order of the cluster energy values.

13. The image processing mask creating method according to claim 10, in the calculating,
    wherein core points of K clusters are randomly arranged in the image processing mask and the core points are created by energy drop, and
    wherein serial numbers 0 to K−1 are given to the K core points in ascending order of the cluster energy values.

14. The image processing mask creating method according to claim 1, in the ranking, wherein the cluster energy of a considered point is calculated as the energy between the considered point and the points having lower ranks when a rank i is given in ascending order, wherein the cluster energy of a considered point is calculated as the energy between the considered point and the points having higher ranks when a rank i is given in descending order, and wherein the considered points are taken from all the points not ranked yet in any case and the rank i is given to the point having the minimum cluster energy among the considered points.

15. The image processing mask creating method according to claim 14, in the calculating, wherein core points of K clusters are randomly arranged in the image processing mask and the core points are created by energy drop, and wherein serial numbers 0 to K—1 are given to the K core points in ascending order of the cluster energy values.

16. The image processing mask creating method according to claim 1, in the calculating, wherein core points of K clusters are randomly arranged in the image processing mask and the core points are created by energy drop, and wherein serial numbers 0 to K−1 are given to the K core points in ascending order of the cluster energy values.

17. The image processing mask creating method according to claim 1, wherein the formation of clusters is inverted from black to white or from white to black at a predetermined density.

18. An image processing device comprising:
a receiving unit that receives an image;
a mask processing unit that creates a halftone image by performing a mask processing process of comparing pixel values of the received image with the threshold values in the image processing mask created by the image processing mask creating method according to claim 1 on the image received by the receiving unit; and
an output unit that outputs the halftone image created by the mask processing unit.

19. A non-transitory computer-readable recording medium having an image processing program recorded thereon, causing an image processing device to serve as:
a receiving unit that receives an image;
a mask processing unit that creates a halftone image by performing a mask processing process of comparing pixel values of the received image with the threshold values in the image processing mask created by the image processing mask creating method according to claim 1 on the image received by the receiving unit; and
an output unit that outputs the halftone image created by the mask processing unit.

20. A non-transitory computer-readable recording medium having an image processing mask creating program recorded thereon, causing a computer to serve as:
a calculation unit that calculates cluster energy of each point in an image processing mask;
a ranking unit that ranks points in ascending order or descending order on the basis of cluster energy values calculated by the calculation unit; and
a threshold allocating unit that allocates threshold values to the points in the image processing mask on the basis of the ranks as the process result of the ranking unit,
wherein the calculation unit calculates the cluster energy as the sum of interaction values $f_r(\|x-y\|)$ having the distance $\|x-y\|$ between a target point x and a point y belonging to a cluster not including the target point x as a parameter.

* * * * *